United States Patent [19]
Cornell et al.

[11] Patent Number: 4,648,040
[45] Date of Patent: Mar. 3, 1987

[54] ENGINE MONITOR/CONTROL MICROPROCESSOR FOR CONTINUOUSLY VARIABLE POWER TRAIN

[75] Inventors: Charles R. Cornell; David J. Olson, both of Naperville, Ill.

[73] Assignee: J. I. Case Company, Racine, Wis.

[21] Appl. No.: 582,192

[22] Filed: Feb. 21, 1984

[51] Int. Cl.$^4$ .............................................. B60K 41/08
[52] U.S. Cl. ................................. 364/424.1; 74/866; 60/395
[58] Field of Search ............... 364/424.1; 74/856, 860, 74/862, 866, 877, 740, 745; 474/11, 12, 18; 60/395, 445

[56] References Cited

U.S. PATENT DOCUMENTS

| | | | |
|---|---|---|---|
| 3,442,346 | 5/1969 | Winter et al. | 74/745 |
| 3,952,829 | 4/1976 | Gray | 364/424 |
| 4,107,776 | 8/1978 | Beale | 74/866 |
| 4,180,979 | 1/1980 | Cornell | 60/395 |
| 4,425,620 | 1/1984 | Batcheller et al. | 364/424.1 |
| 4,458,560 | 7/1984 | Frank et al. | 74/866 |

FOREIGN PATENT DOCUMENTS 0092227 10/1983 European Pat. Off. ............ 74/866
0180863 10/1983 Japan .................................. 74/866

OTHER PUBLICATIONS

"Continuously Variable Transmission Control" by Ironside et al., Proceedings, International Packaging and Production Conferences, pp. 295–302, Brighton, England, Oct. 1980.

*Primary Examiner*—Parshotam S. Lall
*Attorney, Agent, or Firm*—Cullen, Sloman, Cantor, Grauer, Scott & Rutherford

[57] ABSTRACT

Engine monitor/control microprocessor primarily effective to automatically adjust the engine power setting in a transmission power train in which the transmission drive reduction is variable in ratio, by step change or continuously so, such as for use in farm tractors. The microprocessor adjusts the position of the setting so that engine power set at all levels is produced at the right brake specific fuel consumption for substantially minimum pounds of fuel per horsepower hour, or within a band width thereof if not all that sensitive. Preferably, the microprocessor has a higher priority primary function of also automatically adjusting the transmission drive reduction ratio, for the same purpose but with high sensitivity.

6 Claims, 11 Drawing Figures

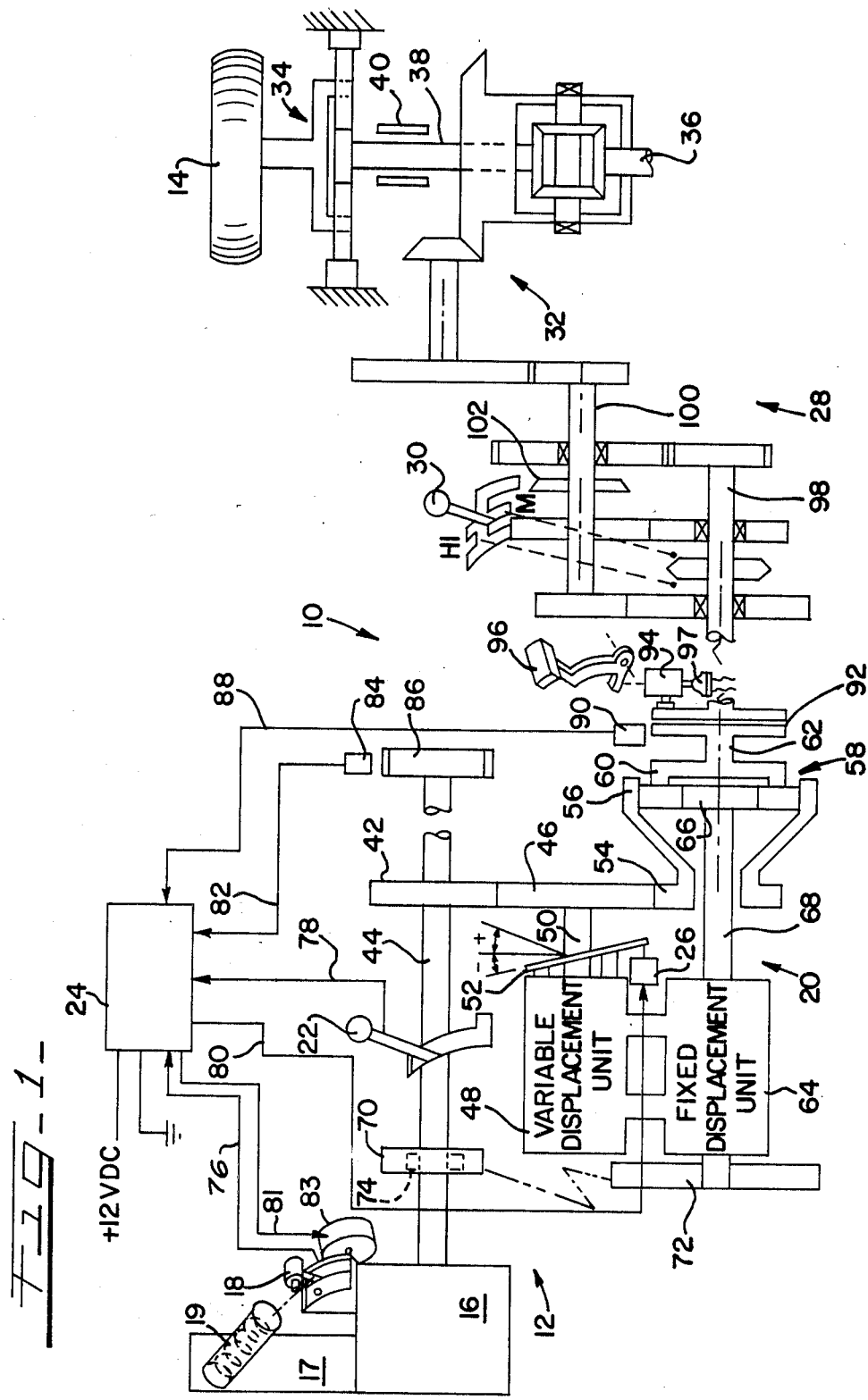

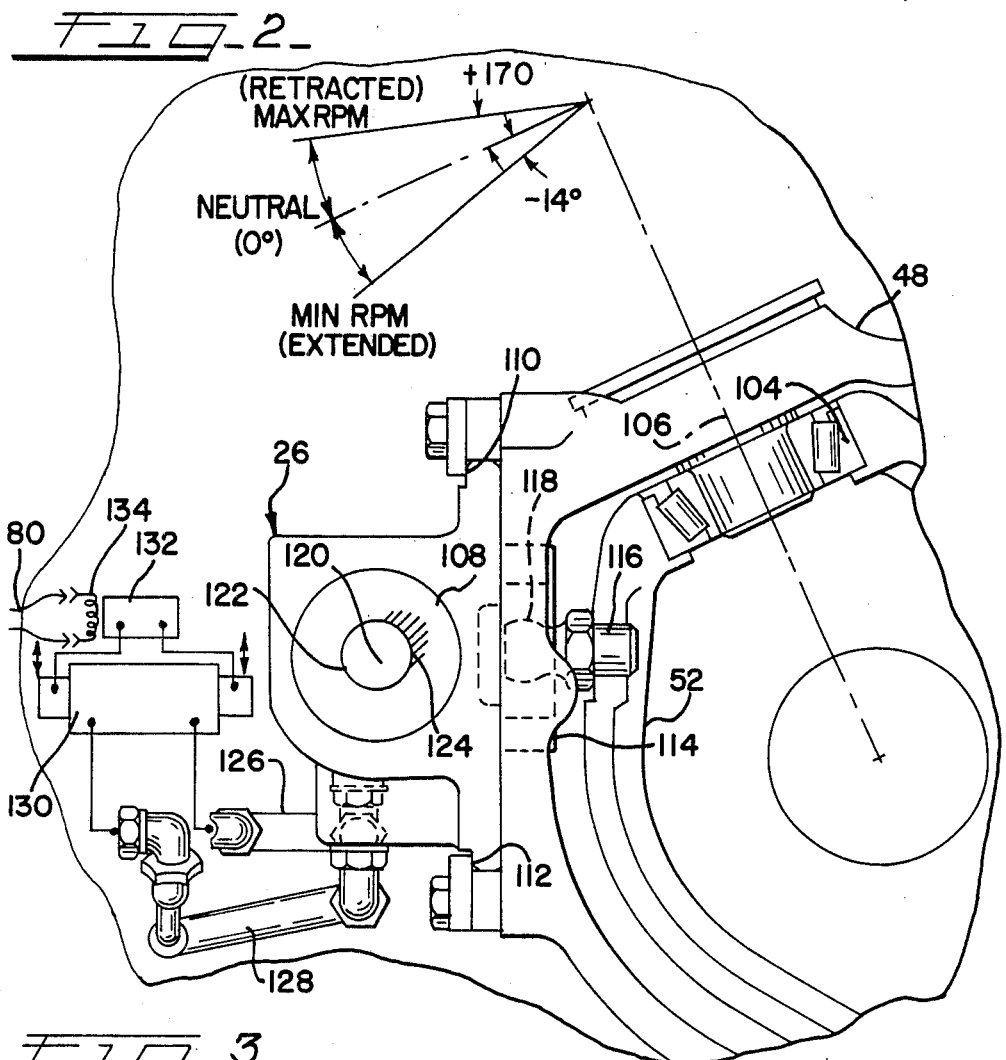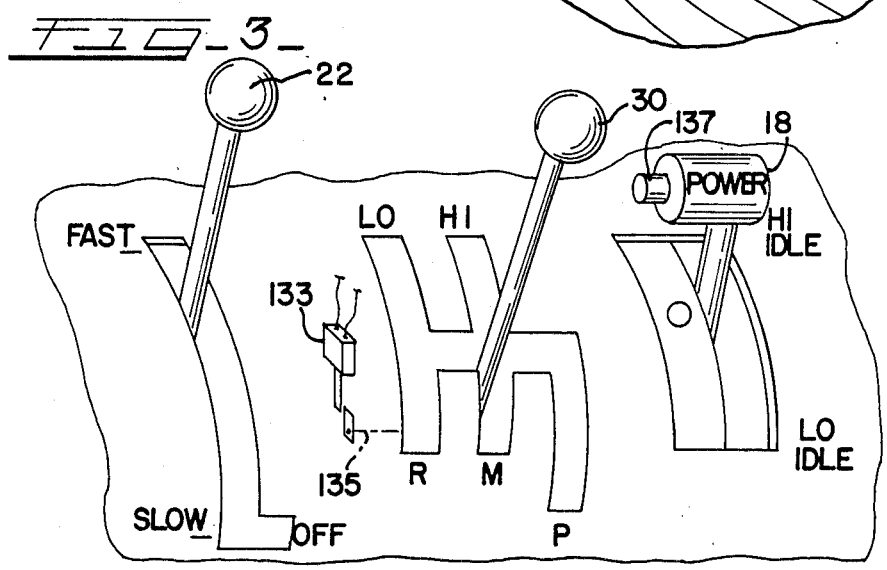

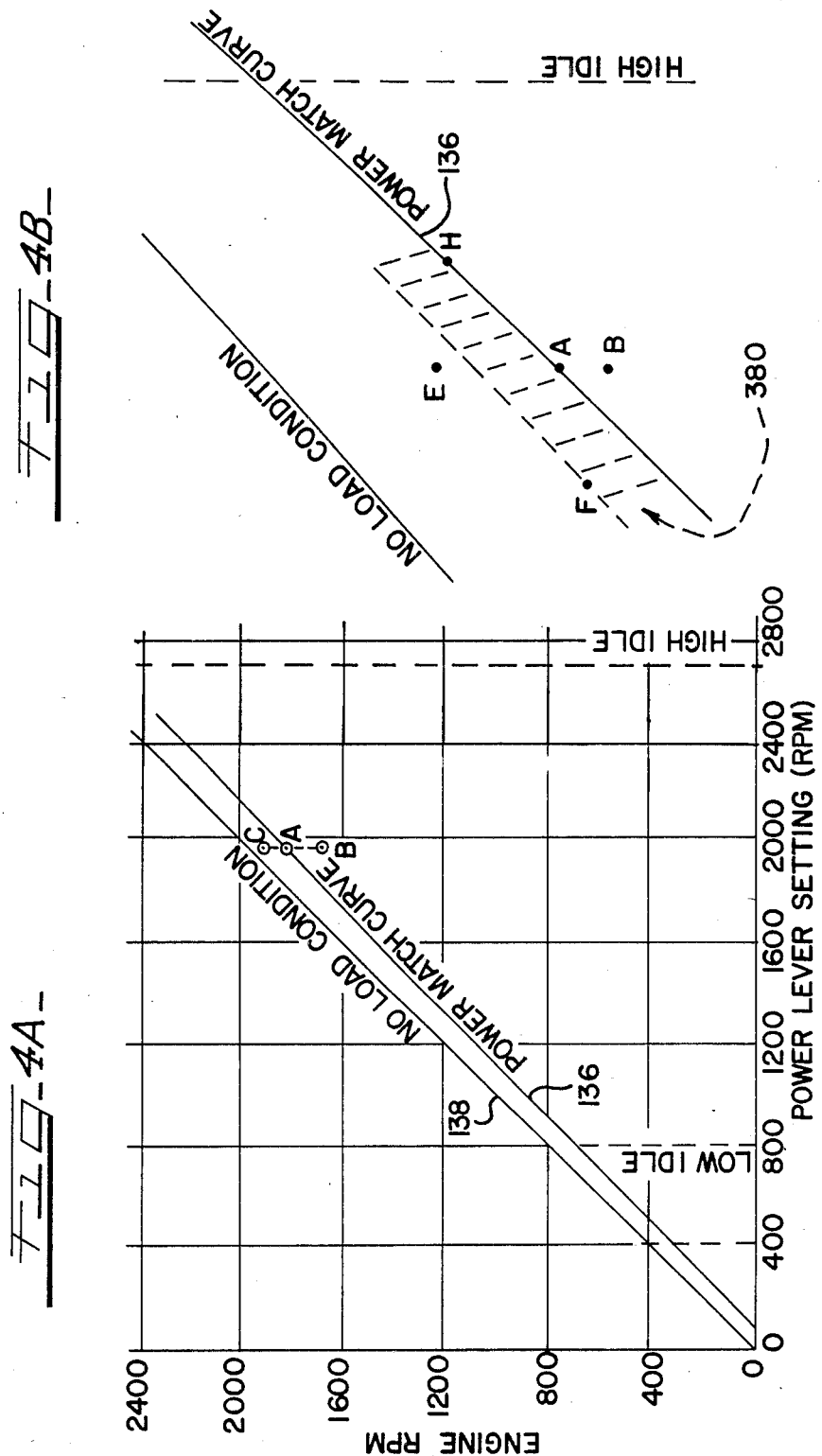

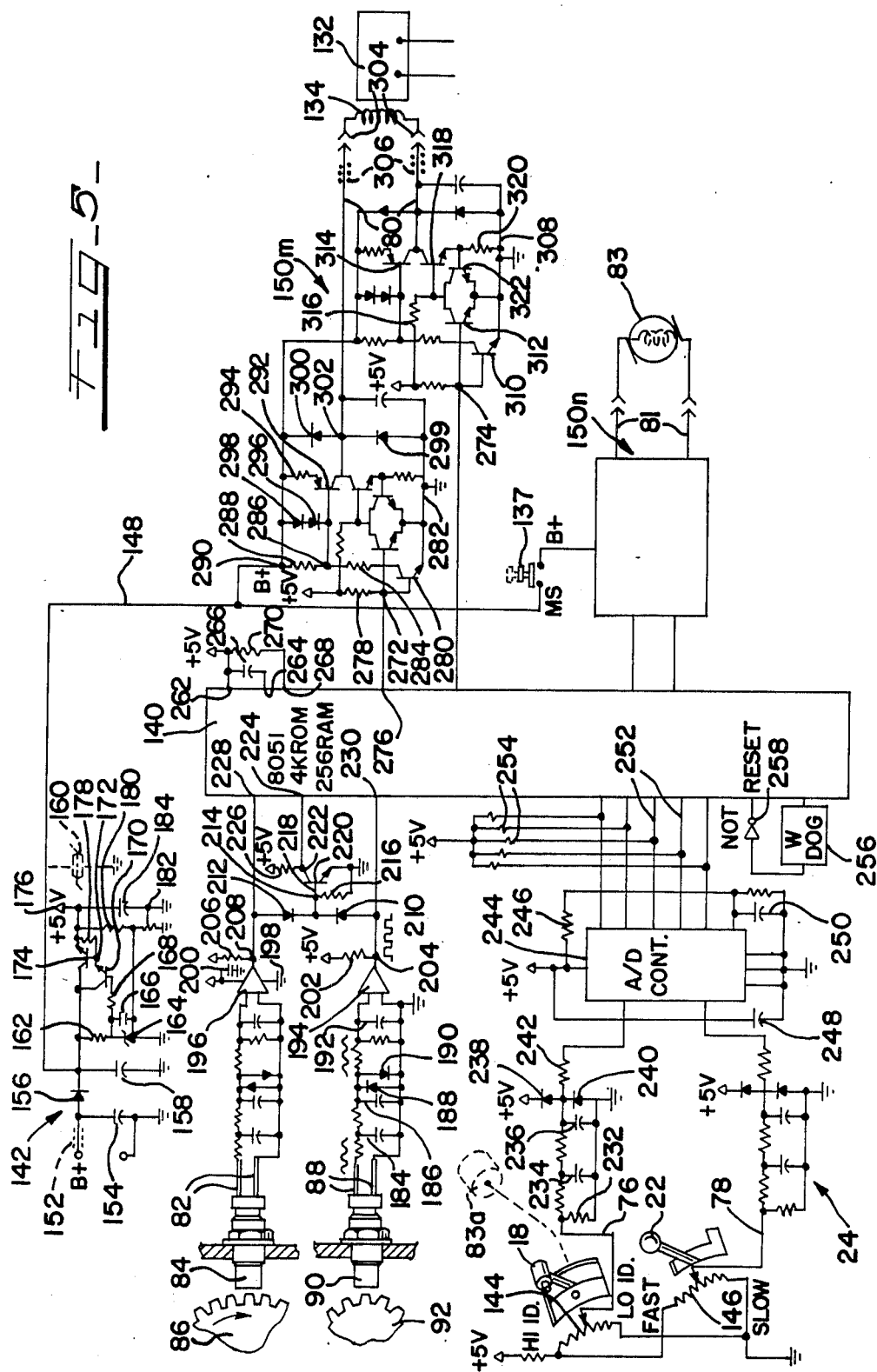

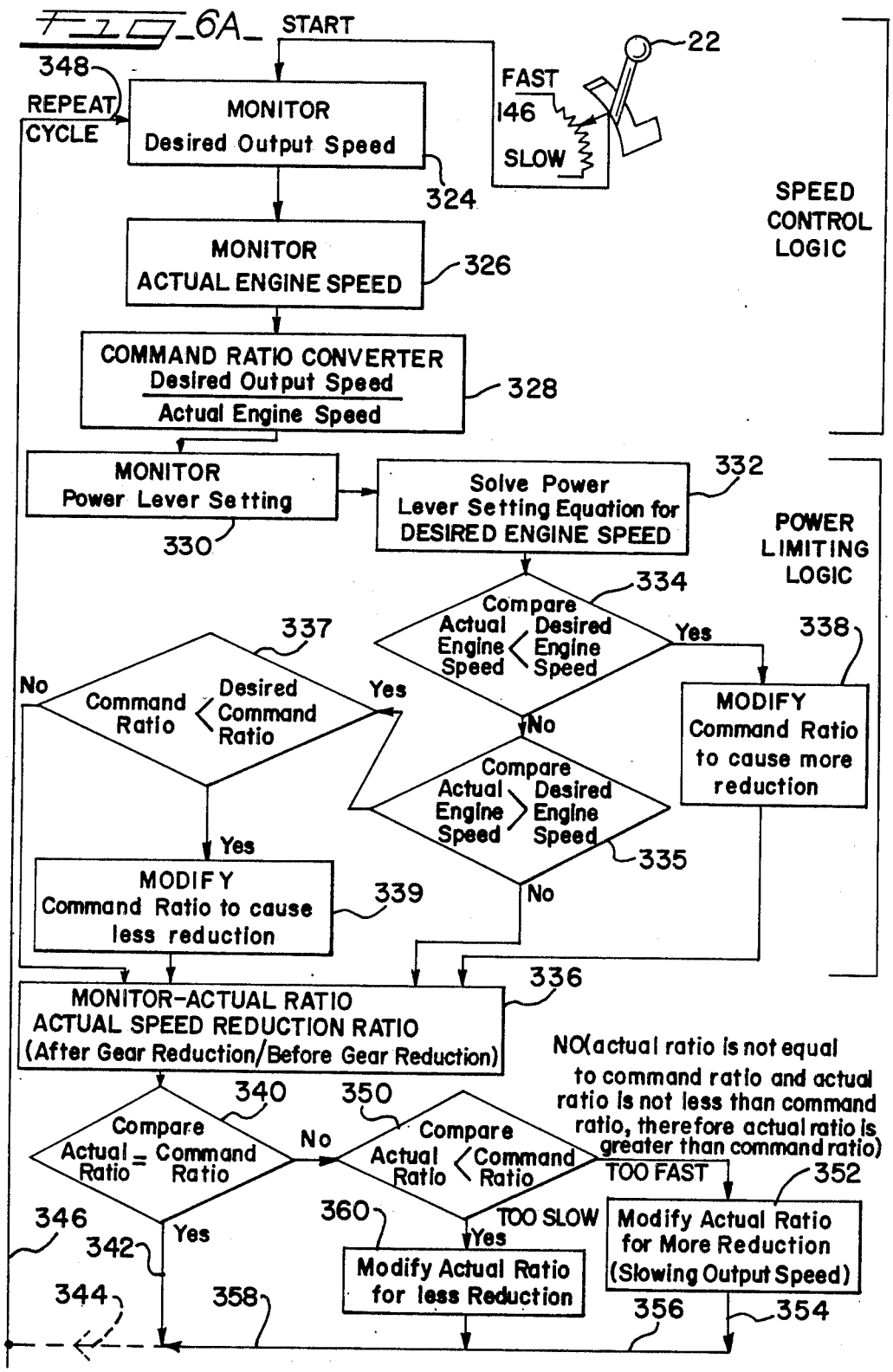

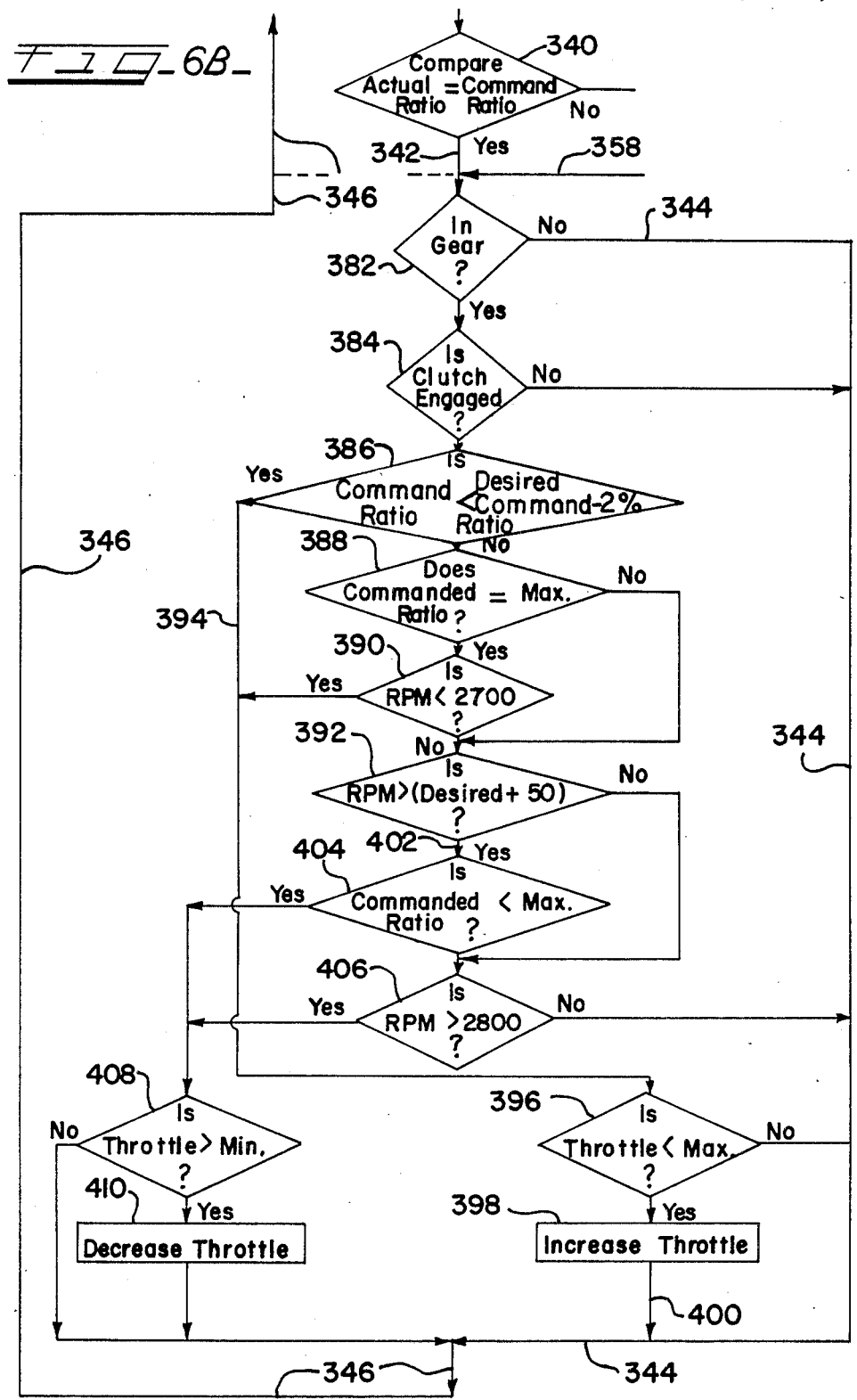

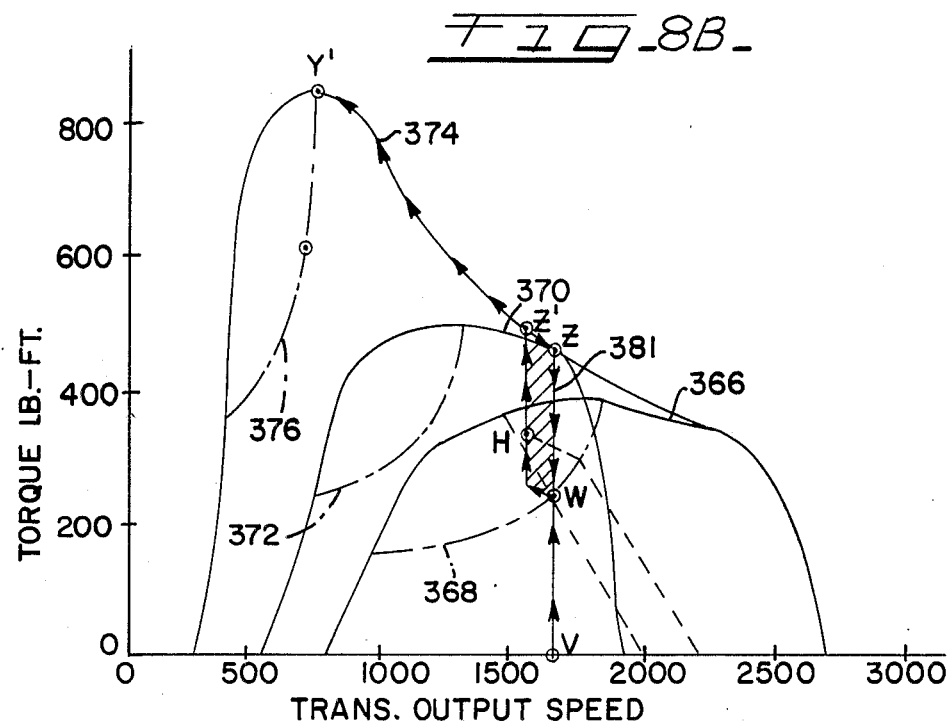

ENGINE MONITOR/CONTROL MICROPROCESSOR FOR CONTINUOUSLY VARIABLE POWER TRAIN

CROSS REFERENCE TO RELATED CASES

This application is a companion case to respectively coassigned U.S. Pat. No. 4,138,907 and Hennessey et al. U.S. Pat. No. 4,388,987 granted June 21, 1983, the power train disclosures of both of which are incorporated in their entirety herein by reference.

Also, this application is related to Cornell coassigned U.S. patent application Ser. No. 512,832 filed July 11, 1983, now U.S. Pat. No. 4,594,666, relating to a power train automatic transmission control. This application embellishes the machinery of the power train with a further control which, briefly stated, amounts to an automatic power control which augments and is preferably used in conjunction with, the automatic transmission control disclosed in the above-identified Cornell patent application.

BACKGROUND OF THE INVENTION

The present invention is energy related, for the purpose of fuel conservation. It controls, as one part and only augmentally so, the engine power setting and further controls, as one part, the effective drive reduction ratio of a power train having a continuously variable or step change transmission, such as broadly used in agricultural and nonagricultural vehicles and machinery, especially an agricultural tractor.

The invention specifically utilizes an engine and transmission, dual function monitor/control microprocessor for a variable ratio power train drive, primarily effective to automatically adjust both aspects of the drive so that engine power at all levels is produced at a brake specific fuel consumption (BSFC) of substantially minimum pounds (or Kg) of fuel per horsepower hour (or KWH).

As background thereto, the material information includes but is not limited to U.S. Pat. Nos. 3,952,829, 4,180,979, 4,091,617, 4,158,290, and especially the (US) Society of Automotive Engineers Paper No. 780465 relating to BSFC and also U.S. Pat. No. 3,914,938.

SUMMARY OF THE INVENTION

An object of the invention, therefore, is to consistently achieve substantially minimum or optimum brake specific fuel consumption in a self-powered vehicle, automatically by means of an engine and transmission monitor/digital-control microprocessor provided for a continuously variable or step change power train therein.

The power train, in the drive line of which the invention is specifically embodied, includes a speed-adjustable engine and a range transmission and, between the engine and range transmission, a hydromechanical speed transmission equipped with pump and motor hydraulic units with variable displacement to vary the transmission ratio infinitely within limits. The range transmission has three or more speed ranges, at least some of which overlap, with infinitely variable speed characteristics because of the just mentioned speed transmission adjustments, incrementally ranging all the way from nominal speed afforded by the speed transmission reduction to much more speed reduction at a substantial ratio.

Another object of the invention, providing for anti-lugging protection of the engine under a worsening load condition, is accomplished by automatically causing the speed transmission to progressively vary from essentially a 1:1 drive ratio to greater ratios and finally a maximum speed reduction ratio as the condition progressively increases rimpull loading. This objective is also accomplished secondarily at the same time by automatically causing the fuel rate of flow to increase and increase the power being made available from the engine. Under normal load conditions, the engine never lugs, being afforded more torque advantage by the speed transmission as indicated and perhaps at the same time more fuel depending on the amount of engine speed or transmission ratio deviation from the optimum.

An additional object is the employment of the monitor/control microprocessor and its memory so as to provide thereto a data base for the engine comprising a predetermined consecutive series of desired engine speed values productive of substantially minimum brake specific fuel consumption for a range of power settings, and thereupon repetitively determining in the microprocessor, at frequent intervals, the desired minimum brake specific fuel consumption speed for the current power lever setting, thus constantly updating the objective of the system, always under easy access to the system, and ever present for due reference and response by the system. The provision of the data base is by simply a matter of known choices, namely, by table, or by other procedure such as an approximation equation.

A more specific object of the invention, directed toward the accomplishment of a fuel-efficient drive system for a variable ratio power train, is the provision of an engine included therein which is adapted for automatic close control of available power and operating speed, an automatically controllable engine power lever operating the engine and having a plurality of operating positions, an operator controlled speed lever establishing a desired transmission output speed of said power train, a plurality of sensors for respectively sensing engine or transmission input speed, transmission output speed, power lever position, and speed lever position, an apparatus for automatically controlling the ratio of the transmission, and for automatically controlling the position of the power lever in response to said sensors, the control apparatus having a dedicated microprocessor programmed to establish a desired engine speed providing the least specific fuel consumption of said engine based on the position of said power lever, and, based on the position of the speed lever, vary the ratio of said transmission to maintain the desired engine speed upon increases in drive train load beyond that producing the desired engine speed for the specific power lever setting and to maintain the desired transmission output speed upon decreases in drive train load beyond that producing the desired engine speed for the specific power lever setting, said microprocessor further being programmed to establish a deadband in which the engine speed can exceed the desired speed without additional effect and upon the engine speed exceeding the deadband causing a decrease in the power lever setting thereby establishing a new desired engine speed, the microprocessor being still further programmed to establish a deadband in which the ratio of the transmission can be reduced without additional effect and upon the transmission ratio being reduced beyond the deadband, actuating the power lever to increase the power setting thereby increasing the desired engine speed while maintaining the desired transmission output speed.

DESCRIPTION OF THE DRAWINGS

Further features, objects, and advantages will either be specifically pointed out or become apparent when, for a better understanding of the invention, reference is made to the following description, taken in conjunction with the accompanying drawings which show certain preferred embodiments thereof and in which:

FIG. 1 is a schematic representation of a tractor power train as taken essentially in top plan view and embodying the control in accordance with the invention;

FIG. 2 is a partial, transverse-sectional view, partially schematic, showing the electrical hydraulic, variable displacement mechanism for changing the speed reduction ratio of the power train;

FIG. 3 is an isometric view showing the power train controls provided for the tractor operator;

FIG. 4A is an actual speed-desired speed graph with the power match curve, at which minimum brake specific fuel consumption is attained, plotted thereon for a direct injection diesel engine, and complementary FIG. 4B corresponds as an inset of the same graph, to enlarged scale to show additional, modifying data;

FIG. 5 schematically includes the control of FIG. 1, and further includes the operator's controls of FIG. 3 and part of the schematic portion of FIG. 2, all in an overall schematic control diagram;

FIG. 6A is a block diagram sequencing those operating steps which the automatic transmission control is programmed to follow, and complementary FIG. 6B delineates the corresponding diagram for the automatic power control;

FIG. 8B is the complementary graph which illustrates a representative drive train curve with the automatic power control feature.

A PREFERRED EMBODIMENT

Figure 7:
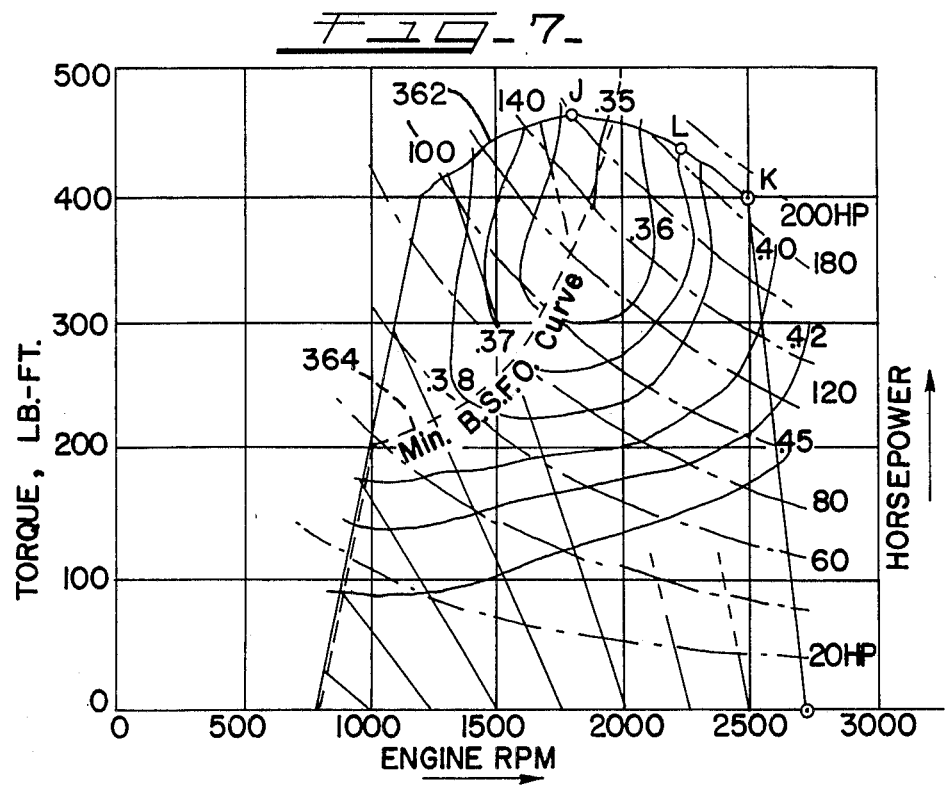
FIG. 7 is an engine rpm-torque graph showing rated power torque, with superposed plots thereon of the governor droop curves, constant BSFC loops, and the discerned pattern of least BSFC points, the locus of which generates a single discrete minimum BSFC curve.

More particularly, as shown in FIG. 1, the power train 10 of a farm tractor 12 supplies power for rimpull torque at the tractor drive wheel, of which the right rear wheel 14 is representative, through a path including an engine 16 controlled by a fuel injection pump 17 having a mechanical speed governor 19 of the well-known type manufactured by Robert Bosch Company under the designation "RSV" including a spring tensioned speed setting mechanism controlled through a linkage by a power lever 18 to change the governed speed setting by an appropriate change of spring tension. It will be appreciated that, in place of the mechanically controlled injection pump 17, an electronically controlled injection pump might be utilized wherein the fuel output of the injection pump, and thus the engine speed is varied in response to the signal 81 described hereinafter which in the preferred embodiment controls the power lever 18.

There is further provided a hydromechanical speed transmission 20 controlled indirectly with a speed lever 22 and an electrical hydraulic actuator 26 by way of a control module 24. A three-speed, reversible range transmission 28 controlled by a gear shift lever 30, a reduction gear and differential drive 32, a planetary final drive 34 for each drive wheel, and rear drive axles identified at 36 at one side and at 38 at one side connected between the differential 32 and final drive at that side and controlled by a steering brake 40 complete the power train.

In the hydromechanical speed transmission 20, a drive gear 42 on the engine powered, transmission input shaft 44 continually meshes with a countershaft gear 46 which drives a swash-plate-controlled variable, axial piston hydrostatic pump 48 through an interconnecting countershaft 50. The actuator 26 tilts and holds a pump swash plate 52 so as to destroke it to zero pump displacement, and moves it therefrom through positive and negative angles for flow reversal by the pump at varying displacements.

The countershaft gear 46 also continuously meshes with a gear 54 connected to the right gear 56 of a three element planetary gearset 58 not only providing one of two inputs but also providing two different drive modes, regenerative and split. A planetary carrier 60 serves as the element driving the planetary output shaft 62.

A reversible fixed displacement axial piston motor 64 is mechanically connected to a planetary sun gear 66 by a sun gear shaft 68, and is hydraulically connected to the variable displacement pump 48 so as to be driven by the latter at varying speeds in opposite directions. But despite the sun gear 66 being rotatable in opposite directions, nevertheless the planetary ring gear 56, carrier 60, and planetary output shaft 62 always partake of rotation in the same direction as the transmission input shaft 44. With the swash plate angle full negative and a reverse moving sun gear 66, the effective hydromechanical gear reduction ratio provided at 58 is 1:2.39, and with the swash plate angle full positive and forward sun rotation (i.e., in engine direction), the gear reduction ratio effectively obtainable is 1:1.005.

A pinion 70 supported for rotation on and relative to the transmission input shaft 44 constantly meshes with a gear 72 secured to the same sun gear shaft 68 as the motor 64. The fixed ratio constraint thus imposed on pinion 70 causes it normally to rotate oppositely to the shaft 44, or to rotate in the same direction therewith but normally at a slower speed. Extremely strenuous transmission start up conditions and others can cause the pinion 70 to reach the same speed in the same direction as shaft 44, causing engagement of a one-way overspeed clutch 74 interposed between the pinion and shaft 44 so as to cause the pinion 70 to be a reaction member to sun 66 and motor 64; in that way, strenuous conditions can never make the motor 64 overspeed beyond the geared limits established by the reaction member, i.e., the pinion 70, and so the motor 64 cannot be damaged internally by excessive speed. For further details, reference can be made to the afore-mentioned U.S. Pat. No. 4,138,907.

A power lead 76 from the power lever 18 enables the module 24 to monitor the power setting, and a speed lead 78 from the speed control lever 22 enables the module to monitor the transmission speed setting. The module 24 is powered by +12 V DC as illustrated and, by an ouput cable 80, automatically controls the electrical hydraulic actuator 26 for the swash plate.

By another interconnecting power output cable 81, the module 24 automatically controls a DC motor 83 which is shaft connected, at the pivot of the power lever 18, to rotate the latter into desired spring tension setting positions for the governor mechanism 19, thus resetting injection pump 17 and controlling the engine speed and the available engine power.

An engine speed lead afforded by a connection 82 from a transducer 84 enables the control module 24 to monitor, via one gear 86 indicated on the engine powered, transmission input shaft 44, the actual engine rpm at the input to the hydromechanical speed transmission 20, i.e., before gear reduction. A similar transducer 90 and transmission speed connection 88 enable the module 24 to monitor the drive side of a mid-mounted master clutch 92 for the transmission output rpm, i.e., after gear reduction. A valve controlled hydraulic actuator 94 causes internal multiple plates of the pressure-disengaged clutch 92 to disengage and to engage, respectively, under control of a tractor clutch pedal 96 when it correspondingly is depressed and released. Hydraulically connected to the actuator 94 is a normally open pressure switch 97 which, in response to an hydraulic pressure rise sufficient to disengage the clutch, closes its contacts. In other words, the driver closes the switch 97 by depressing the clutch pedal, and a closed circuit, not shown, signals that the clutch is decoupled. Switch 97 could also be a mechanical switch actuated by the clutch pedal, if desired.

The clutch 92 decouples to allow gearshifts in the range transmission 28 and can then recouple together the respective transmissions 20 and 28.

The range transmission 28 has respective sets of speed changing gears mounted on the input and output shafts 98 and 100, respectively. When the lever 30 is shifted into the position marked HI a synchronized jaw clutch sleeve shifts on shaft 98 for establishing high range, and a shift of the lever 30 into the position marked M causes an opposite synchronized jaw clutch shift on shaft 98 for mid-range setting in the transmission. The sleeve 102 of a LO synchronized jaw clutch on output shaft 100 is employed for low range and additional means are provided for reverse, not shown, for the range transmission 28.

Gear ratios are selected such that the range transmission 28 provides substantial overlap in its mid range M, so that the infinitely variable speeds otherwise available in the top of the LO range can be readily duplicated, without downshifting, while in the bottom of the mid range M. Similarly, the bottom of the HI range can be duplicated with infinite variability in the top of the mid range M, without need for upshifting while variations are made within such range of overlap.

For purposes of discussions following immediately hereinafter, the range transmission 28 will be presumed to be in its mid range M which in practice covers the infinitely variable speeds at which the present tractor, and agricultural tractors generally, are utilized approximately 90 percent of the time; those speeds are generally the ones used in actual field work.

In accordance with the principles of the reaction member control in hydromechanical transmissions, the effective gear reduction ratio of speed transmission 20 is established by control of the sun gear 66 in its speed and relative direction of rotation, under the accurate direction of the pump swash plate 52 according to its angle of tilt. Carefully controlled actuator means 26 is provided for the purpose.

ELECTRICAL HYDRAULIC ACTUATOR—FIG. 2

The swash plate 52 is mounted transversely within the case of the pump 48 so as to be centered in a span of bearings, a representative one of which is the tapered bearing 104 defining the plate tilt axis 106. The actuating means 26 comprises a double acting hydraulic cylinder 108 arranged with its housing guided in fixed motor slideways 110 and 112 and having a lug 114 projecting through a window, not shown, cast as a long longitudinal slot in the side of the pump casing. A stud 116 held in screw threads in the swash plate 52 has a ball end 118 projecting laterally into, and closely confined within, a complementary slot in the lug 114. Accordingly, as the cylinder housing moves longitudinally along the side of the pump case as guided along a piston shaft axis 120 for the cylinder, the pump swash plate 52 changes its tilt and then stops within the angular swing range indicated about its tilt axis 106.

In one physically constructed embodiment of the invention, the piston shaft 122 defining the axis 120 of the double acting cylinder 108 projected through seals at opposite ends of the cylinder 108 and was fixed at anchor 124 at the proximal end as viewed in FIG. 2. Connections were such that as the distal hydraulic service line 126 was pressurized so as to introduce fluid to the far side of the fixed piston, not shown, the housing of the cylinder 108 within slideways 110,112 retracted therein relative to proximal anchor 124 so as to tilt the swash plate for positive angularity and higher speed with less gear reduction. Conversely, pressurization of the proximal service line 128 caused advance of the housing of cylinder 108 back toward the anchor to produce negative plate angularity and more gear reduction in the speed transmission, not shown.

The actuating means 26 further comprises a two-way, closed center piloted valve 130 which hydraulically locks it, in response to a proportional pilot valve 132 commercially available. The microprocessor output cable 80 through a proportional coil 134 automatically electrically controls the pilot valve 132, the pressure output of which is proportional to pulse width and direction of the signal electrically supplied through the cable 80.

Prior to instituting this automatic tilt angling operation the operator will set the range transmission, for example, in mid range M, and will also set the other controls for speed and power by close estimation according to his experience.

OPERATOR CONTROLS—FIG. 3

In this enlarged scale figure illustrating the operating console controls with greater particularity, all positions including park P for range shift lever 30 are shown, except for the unmarked neutral position N in which it is pivoted as actually illustrated. As shown in operative association with the lever 30, an out-of-neutral monitor microswitch 133 opens a circuit controlled thereby (not shown) signals that the range transmission is out of neutral N. The microswitch 133 is provided to indicate a neutral N setting and, similarly but not shown, a means is also provided to electrically indicate park P. The microswitch 133 is cammed closed by the lever pivot shaft 135 when in neutral N and thus interrupts the out-of-neutral signal.

A manual out-in plunger switch 137 carried by the handle of the power lever 18 has a spring biased, switch-open position when in its "out" position as illustrated. The power lever 18 takes the corresponding status of being manually operable by the driver, adjustable at will solely by him. But when thumb-depressed into the handle into its detented "in" position, not shown, the manual switch 137 closes, switching the power lever 18 into automatic operation to be disclosed hereinafter. It will be appreciated that if manual control of the engine field operating speed is not desired, the power lever 18 may be dispensed with and the module 24 could directly control the injection pump. A simple switch could be provided for shifting the engine between low idle and the operating range for automatic operation.

In the field, the operator sets the power lever 18 somewhere above the LO idle position up to and including the so-called HI idle or wide open throttle position. The engine may be loaded or unloaded in the position set, depending upon tractor rimpull being required or not.

At the same time, the operator sets the transmission output speed lever 22 at a point between or including FAST and SLOW appoximating the effective gear reduction expected to be required in the speed transmission while the range transmission remains in its aforementioned mid-setting. Then the clutch pedal, meantime depressed, is released and the tractor proceeds, effectively handling the job as it goes and equally effectively being conserving of fuel as it goes.

Novelty is felt to reside in the herein recognized utility for tractor fuel conservation and in the automatic module approach hereof for satisfying that utility as can be graphically appreciated.

ENGINE RPM VS. LEVER POSITION—FIGS. 4A and 4B

These figures are a graph of actual engine speed plotted against engine power lever or throttle setting, all in revolutions per minute. The particular engine is an International Harvester DTI-466B diesel engine. The power match curve 136 represents the lowest specific fuel consumption (BSFC) of the engine in pounds of fuel per horsepower-hour (or Kg/KWH) for each power lever setting. For example, point A is the minimum BSFC for a power lever setting of about 1950 rpm. The corresponding actual engine rpm is about 1800 rpm for the minimum BSFC point A, i.e., for that specific power lever setting. The curve 136 can theoretically never reach the no load condition curve 138 which shows higher speeds at all points because at no load BSFC is infinite.

Each power lever setting in the available range from LO idle to HI idle will have its own least BSFC engine speed, thereby generating the power match curve 136. One example will typify the rest in the range.

EXAMPLE I

In this example for an engine power lever setting of 1950 rpm, by means of the automatic tilt angling of the swash plate as discussed above, the speed transmission establishes a lowest BSFC operating point A indicated on curve 136 resulting in an actual engine speed of about 1800 rpm due to the mechanical advantage afforded by the speed transmission.

That advantage, let us assume, occurs with an effective 1:1.5 gear reduction in the speed transmission. The control module 24 has two modes depending upon the condition encountered.

If the soil condition were, for example, to add more rimpull resistance to the tractor, a point B having an engine speed of, say 1700 rpm, might be reached for the 1900 rpm power lever setting. However, the control module 24 immediately senses the underspeed and begins its primary or power limiting mode of operation. The effective gear reduction ratio in the speed transmission is automatically changed for more reduction, for example to 1:1.7, obviously giving the engine more of a mechanical advantage so it can speed back up to the actual desired speed A, to restore least BSFC operation but naturally at the expense of slowing the tractor ground speed somewhat.

In other words, temporarily increased rimpull resistance would seem normally to demand reaction by the operator to advance his power lever setting and thus compensate with increased engine power output. But with automatic power limiting, and at optimum BSFC efficiency as described, the module automatically does the compensation without a requirement for operator intervention and without the engine being lugged down in speed by the temporarily increased load.

When the rimpull resistance returns to the original value, the control module operates, in another phase of its power limiting logic mode, to sense the resulting tendency of the temporarily assumed actual drive reduction ratio to produce a higher engine speed than to the calculated optimum represented at point A. To counteract this tendency to operate with too much effective gear reduction ratio and too high engine speed, the module automatically decreases the effective gear reduction ratio from 1:1.7 back to the initial lesser ratio of 1:1.5 appropriate to a higher tractor speed. That is to say, the engine is automatically afforded less of a mechanical advantage over the now-reduced load until the original condition is restored. It can handle a greater load at its power setting and is therefore loaded up to a greater amount, and the power match is restored right back to the least BSFC value.

A contrasting cycle, completed under a different mode of operation of the module, is to be taken up in the example now to be considered.

EXAMPLE II

If, while operating at point A appearing in the graph shown in FIG. 4A, soil resistance stays the same but the tractor encounters a slight short downslope, as an example of a lightened load, the control module 24 enters into the second, or constant ground speed mode of operation. It does so because of the actual change of the operating point to point C, say, 1900 rpm, again with a power lever setting of 1950 rpm and an effective transmission ratio of 1:1.5. Engine speed-up on such a short downslope tends to cause a finite increase of ground speed, and the speed transmission automatically causes more reduction ratio, e.g., 1:1.7, restoring the initial ground speed desired. The speed control logic mode perforce continues because, all the while, the primary power limiting logic mode has been satisfied, that is, both the engine speed and the output or ground speed are at or above their desired values.

So the tractor compensates by reducing ground speed back down to the original ground speed whereupon, to continue with this example, the tractor then makes the transition by bottoming out at the end of the short slope.

The cycle is completed because, at the end of the short slope, the operating point A is resumed. That is, the module automatically adjusts the transmission setting for less gear reduction back to the originally assumed 1:1.5 ratio. Thus, from a former optimum setting condition A, the tractor without operator intervention immediately made adjustment to hold constant ground speed when on the downslope, and immediately readjusted to the former optimum setting condition to keep that same constant tractor speed when off the slope.

The control module carefully monitors the power train and has means provided for programming it for the operating modes appropriate to the conditions being monitored. An explanation follows.

MODULE—FIG. 5

At the center of the control module 24 as shown in this figure is a microprocessor computer 140 having its own memory and proper programming for the operating modes required.

Inputs include a power supply 142 for regulated +5 V input power, the magnetic transducer 84 adjacent gear 86 for engine speed rpm, the magnetic transducer 90 adjacent the clutch gear 92 for transmission output speed rpm, a +5 V potentiometer 144 for monitoring the setting of the power lever 18, and a speed potentiometer 146 for monitoring the transmission speed lever 22 for its setting.

The outputs include the proportioning coil 134 for the swash plate pilot valve 132 for controlling the speed transmission and the power output cable 81 to the governor motor 83 for re-setting the power lever 18 automatically when the operator has switched it for automatic operation as discussed above.

B+ power is impressed on the +5 V power supply 142 and, by a connection 148 is also impressed on a pulse width modulated swash plate drive circuit 150m. A ferrite anti-noise bead 152 is present in the B+ lead to the power supply 142 and a tantalum capacitor 154 having one plate grounded is also present thereat to reduce high frequency electromagnetic interference from entering into the power supply 142. Also present is a series-connected reverse-polarity-detecting diode 156 to insure against damage in case the power supply is connected with wrong polarity to the source of B+. An electrolytic capacitor 158 having one plate grounded filters the B+ power. Also, a varistor 160 grounded at one side will, if optionally provided, protect against noise transients occurring from the B+ source from time to time.

A resistor 162 leading from the B+power line is series connected to ground by a Zener diode 164 having a capacitor 166 parallel connected therewith and together serving as shunt series regulator to regulate voltage of the power supply.

A resistor 168 impresses the Zener voltage on the base of an NPN transistor 170 which, through its collector, delivers to the B+ power line electrons that its emitter is pumping from a junction 172 out of the base of a second NPN transistor 174. The NPN transistor 174 conducts electrons from the +5 V linear voltage regulated terminal 176 through its emitter to the B+ power line through a collector connection to the latter, and incorporates a base bias resistor 178. Two series connected resistors 180 and 182 as supplemented by a paralleled capacitor 184 serve in conjunction with the transistors to define what the regulated linear output voltage will be at +5 V terminal 176.

The transmission speed control 88 from the transducer 90 on speed transmission clutch output gear 92 transmits therein an essentially sinusoidal wave which first encounters in two stages of the circuit a pair of RC filters 184 and 186. The wave then encounters a pair of oppositely poled diode clippers 188 and 190 which clip off the waves so that they are flat on top and on bottom, limited to about 1½ V peak to peak. Further RC filtering at 192 is followed by direction of the wave pulse as input to a schematically shown comparator 194. Full connections thereto are shown by way of a counterpart comparator 196 grounded at 198 and receiving +5 V through a terminal connected through a capacitor 200 to ground. The comparator 196 is connected to engine speed transducer 84 in the same manner.

The regulated linear +5 voltage is supplied through a resistor 202 to the output junction 204 of comparator 194, whereas another similarly supplied resistor 206 is connected to the output junction 208 of the counterpart comparator 196.

The output at junction 204 is the square wave indicated and, similarly, the output at the comparator junction 208 is such a square wave. Those waves in one physically constructed embodiment of the invention ranged in frequency from 10 Hz to 7000 Hz and had digital form for ease in computing shaft rpm.

At the noted frequencies, the rpm signals of engine speed from 84 and transmission output speed from 90 are separately handled and analyzed by the microprocessor 140 by multiplexing, starting at their output junctions 204 and 208, respectively. A pair of diodes 210 and 212 bridging therefrom are joined in series cathode to cathode and their junction is connected to a junction 214.

A bias resistor 216 and base connector 218 from the junction 214 act in a way on an NPN transistor 220 so that, for example, the square wave pulses alone at 204 are ineffective to allow the transistor base to turn on transistor 220 through the diode 210. But the transistor 220 has a special inverter function connection 222 of its collector to a pin 224 on the microprocessor 140 and also to the linear voltage regulator's +5 V through a resistor 226. Thus, according to multiplexing procedure, the microprocessor 140 in order to measure engine rpm has a pin 228 go positive in readiness as to when the square wave causes junction 208 linkwise to go positive. At that point of coincidence, the inverter transistor 220 by inversion causes the pin 224 to go low, starting a timing cycle within microprocessor 140. That cycle counts the interval until the next coincidence between the positive (high) pin 228 and the positive-going square wave at 208, which causes the pin 224 on microprocessor 140 to go low again so as to terminate the timing interval. The engine rpm is at once determined by microprocessor 140, whereupon it causes another pin 230 connected to junction 204 to go positive so that the microprocessor 140 can similarly determine the transmission output rpm from the tooth speed of the turning gear 92.

The cycle then repeats, and does so about sixty times per second in the microprocessor.

Transducers critically placed about the transmission and engine to provide appropriate electrical frequency signals to the speed connections 82 and 88 can be selected from the group of a variable reluctance magnetic pickup, an optical pickup, and other magnetostrictive or other type pickups which provide a signal proportional, for example, to gear tooth frequency.

The power lever 18 appearing in FIG. 5 has a mechanical linkage which has heretofore been described for making changes in the setting of the governor 19. Such changes can also be accomplished by electrical controls. Separately, the electrical connection by means of the potentiometer 144 serves as the means of constantly monitoring the power lever position and hence the engine governor setting.

A pull down resistor 232, appropriately grounded, provides for fault protection to the potentiometer power lead 76, as in the case of a broken wire, for example. Two stages 234,236 of RC filtering are present in the power lead, and also present are a pair of series connected clamping diodes 238,240 poled as shown to protect the power lead against noise spikes; finally, a current limiting resistor 242 leading from the clamping diodes' midjunction delivers the monitored power lever voltage setting signal to an analog to digital converter 244. The analog to digital converter 144 is commercially available under the National Semi-Conductor designation ADC0833 and is found to perform satisfactorily. Linear voltage as regulated to +5 V is supplied to the converter 244, suitably bypassed for noise and other protection purposes by a resistor 246, a filter capacitor 248, and an RC network 250. The converter 244 supplies input to the microprocessor 140 through the various pin leads 252 which are supplied through resistors 254 at +5 V by the linear voltage regulator. That input is digital input for ready consumption by the microprocessor 140.

The transmission speed lever 22 is not only digitally monitored in this same way by the converter 244, but is also served so as to supply its own digital command signal to the microprocessor 140 for direct control through pilot valve 132 over the swash plate tilt angle. The pilot valve 132 is a commercially available electrohydraulic proportional servo valve. In other words, it has no mechanical connections similar to that of the power lever and hence relies exclusively on digital control over the swash plate.

A watchdog circuit 256 operates through a comparator and a NOT gate 258 as a timer to restart the microprocessor 140 in regular way in case something has meantime gone wrong.

The microprocessor 140 receives through its input pin 262 the necessary power to run it from the +5 V linear voltage regulator. An adjacent pin 264 is connected to the regulator by a decoupling capacitor 266 for blocking power source noise. Another adjacent pin 268 is connected by a resistor 270 to the +5 V linear voltage regulator for biasing the microprocessor 140 constantly to use its aforementioned internal memory.

The required input crystal, a CPS Knight, which is connnected in standard way is omitted from the showing of the microprocessor 140 in FIG. 5.

The transistors employed in the pulse width modulated swash plate drive circuit 150m of FIG. 5 are all of the NPN type except 292 and 314 which are of the PNP type. Of the two service connection junctions 272 and 274 of that circuit, the junction 272 has among others, a connection to an output pin 276 on microprocessor 140, a connection through pull-up resistor 278 to the +5 V linear voltage regulator, and a connection to the base electrode of a transistor 280. The transistor emitter is connected to a ground line 282 and the collector is connected, in order, through a resistor 284, a junction 286, a resistor 288, thence to a B+ junction 290 supplied by connection 148.

The second transistor 292 (PNP), the base electrode of which is connected to junction 286, has the emitter connected through a resistor 294 to the B+ junction 290 and has the base connected through the respective cathode-anode of a diode 296 and the respective cathode-anode of a series connected diode 298 to the B+ junction 290; the elements 294, 296, and 298 provide current limiting protection to the second transistor 292. A pair of series connected clamping diodes 299 and 300 provide a cathode to anode and another cathode to anode connection down from the B+ junction 290 to ground line 282; they protect against noise spikes and have an intervening junction 302 connected to the collector electrode of the second transistor 292.

In operation, microprocessor 140 causes pin 276 to go high at the same time that it causes junction 274 to go low. The pull-up resistor 278 goes to the same +5 V potential at its opposite ends and the correspondingly high junction 272 positively biases the base of transistor 280 so that it conducts. Accordingly, the resistor 284 goes less positive at its end connected to junction 286 and causes the base of the PNP second transistor 292 to bias the latter into conducting. So a positive rectangular wave pulse, of modulated width determined by the microprocessor 140, is transmitted from the intervening junction 302 so as to be passed by the output cable 80 through the proportional coil 134 of the pilot valve 132. Suitable cable connectors are indicated in the cable at 304 and suitable anti-noise ferrite beads are indicated therein at 306.

The circuit from coil 134 is completed to ground line 308 in the rest of the circuit in which, because service connection junction 274 is momentarily low, the circuit's respective transistors 310,312 (NPN) and 314 (PNP) are base biased respectively negatively and positively so as not to conduct. A pull-up resistor 316 is connected between the +5 V linear voltage regulator and the base of a transistor 318 and, unimpeded, gives positive base bias to the transistor 218 causing it to conduct and discharge the positive rectangular wave through a resistor 320 thus completing the circuit to ground line 208. The transistor 318 is protected in the usual way by the resistor 320 in conjunction with another transistor 322 which together form a current limiter on the transistor 318.

The positive rectangular wave ceases when the pin 276 allows the service connection junctions 272 and 274 to reach the same potential levels. The next pulse starts after a predetermined interval, and so forth for the successive pulses in the positive direction as long as continued by the microprocessor.

Negative pulses, in succession, are started with successive operation by the microprocessor 140 causing junction 274 to go high at the same time as junction 272 goes low.

The cycles are repeated in either direction and, with pulse width modulation as determined by the microprocessor, the proportional coil 134 receives an average positive current or negative current or no current as a proportional thing, causing proportional fluid directing action by the servo valve 132 acting as pilot valve.

The purpose of the swash plate drive is to provide amplified electrical hydraulic actuation with precise control. The high-low microprocessor output means that the pin such as pin 276 is impressed with +5 V or 0V at extremely low current carrying capacity. The B+ voltage impressed on the drive circuit 150m can fluctuate on the tractor at anywhere from 9 to 16 V whereas, despite the current amplification provided by the transistors, the proportional coil 134 is rated at only 7.5 V which is the most voltage ever impressed upon the coil terminals by the electrically amplifying transistors. Hydraulic amplification in the pilot valve 132 is shown in FIG. 5 greatly increases the force possible because of responsiveness of the piloted servo valve 130 which readily handles the moving and stopping load under which the swash plate is forced to operate.

The control module 24 as shown in FIG. 5 is not confined to any set number of steps or inflexible sequence or order for its operation, although one flow chart for ease of understanding will be given, simply by way of example and not limitation.

LOGIC FLOW CHART—FIG. 6A

The starting point for the control module's automatic operation is the proportional control voltage picked off the potentiometer 146, varying with transmission speed control lever 22 as it positions the slider illustrated, and applied as monitored, according to block 324, is the desired transmission output speed command. The next block 326 of the FIG. 6A flow chart indicates the monitoring of actual engine speed before gear reduction, depending at outset of the automatic operation strictly upon the operator's positional setting of the power lever and existing load on the tractor at the time. The converter block 328 next following represents an operation within the microprocessor of constantly recalculating a control parameter, the commanded speed reduction ratio of the speed transmission, determined as the quotient of commanded speed from block 324 divided by actual speed from block 326. A further crucial block 330 represents constant monitoring of the power lever setting as initially set by the operator at his desire for the general operation he seeks.

The calculation block 332 next following in the sequence represents use of the power lever setting as parameter for the recalculations, updated sixty times per second, of the desired engine speed providing the least brake specific fuel consumption for that particular setting of the power lever; the basis is the Power Match curve of FIGS. 4A and 4B, which is the criterion for least BSFC.

Next, diamond 334 represents the microprocessor's digital signal comparison of actual engine speed to the desired engine speed for least BSFC, as scaled numbers. The latter scaled number for want of a better identifying word is termed the computer's reference command whereas the actual speed scaled number compared thereto is termed the second signal. If the actual engine speed by comparison is equal, there will be no change at point of the diamonds 334 or 335 or in the desired speed command ratio being transmitted to block 336. However, if the actual engine speed drops below the desired engine speed, a Yes is generated which turns on modify block 338. Specifically, the microprocessor is programmed automatically to modify the command ratio signal so as to call for more gear reduction, increasing the mechanical advantage and thereupon restoring actual engine speed to equivalence.

To reach its signal modification step (338), the microprocessor 140 is programmed to detect some predetermined value of underspeed error reached at the preceding logic stage of simple digital comparison (334), before operating swash drive circuit 150m to produce the unmodulated or maximum width, DC rectangular wave pulses. Lesser or zero errors sensed by microprocessor 140 result in modulated drive wave pulses of digitally proportionally lesser or zero width, respectively.

So the main speed command signal, modified or unmodified as appropriate, is transmitted (in ratio form as the command speed divided by sensed actual speed) on to the monitor block 336 which monitors and computes the actual ratio. Unimpeded, that command ratio as a digital signal will be transmitted through monitor block 336, to compare block 340, and thereupon utilized, if necessary, by blocks 350 and 352 or 360 to move the swash plate to bring the actual transmission reduction ratio (After Gear Reduction/Before Gear Reduction) and the command ratio (Desired Output Speed/Actual Engine Speed) into equivalence.

So now the engine speed has been brought back to the desired speed and so, a "No" exists at diamond 334. However, because the command ratio is now less than the desired command ratio, i.e., the ratio based on the desired ground speed set by the speed lever 22, the system remains in power limiting logic mode. A "No" answer also results from compare diamond 335 and so stable operation results, again at fuel efficiency.

When the additional load is now reduced, the engine will have a tendency to speed up. So now a "Yes" answer will result in compare diamond 335 which leads to compare diamond 337 which asks if the commanded ratio is still modified, i.e., is it less than the desired command ratio. A "Yes" result here leads to modify block 339 which modifies the command ratio for less reduction to bring it closer to the desired command ratio. When it reaches equivalence with the desired command ratio, a "No" answer will result from diamond 337 and the microprocessor will shift into speed mode if the engine speed is still higher than the desired engine speed. Until that equivalence is satisfied, the microprocessor will be operating exclusively in its programmed power logic mode although, in the meantime, the suppressed, second speed logic mode earlier mentioned will be continually operating entirely subordinate to, and over-controlled by, the dominant-priority power logic mode.

A means can be and preferably is provided in the power limiting logic to achieve yet finer control while satisfying the logic paths discussed above. This is by use of an integrator circuit to detect the engine speed changes indicated by compare diamonds 334 and 335. Thus, the integrator accumulates the difference between the actual engine speed and the desired engine speed from diamond 334 each time the microprocessor runs through its logic and creates a larger and larger negative error, and thus more and more modification by modify block 338 until the actual speed equals the desired speed and no further error is accumulated. When the compare diamond 335 is activated by the engine speed exceeding the desired speed and thus produces a positive error, this also is accumulated but reduces the negative error, and thus the command ratio modification, until the error becomes zero. As before, further positive error results in the microprocessor entering the speed mode.

So in properly subdued tone, the monitor blocks 330 and 332 for the power logic as indicated continually monitors the desired engine speed and, as represented by compare diamonds 334 and 335, the comparison is continually being made to sense when the power logic mode modified signal to the transmission has brought the actual engine speed back up to the desired engine speed (satisfying the point of least BSFC) and the command ratio up to the desired command ratio (satisfying the speed lever 22). When that point is sensed, and when the desired engine speed is exceeded with the power logic mode remaining satisfied, the microprocessor goes into its speed logic mode, bypassing block 338.

Because the rpms of actual transmission output speed and actual engine speed are constantly known, the block 336 representing constant monitoring of the actual speed reduction ratio functions in the same way as block 328 for the command ratio. Therefore, the actual speed reduction ratio from block 336 and the command speed reduction ratio from block 328, when compared at the step represented by diamond 340, will in the ideal case find equivalence of digital signal when the main command signal is modified just right. So the cycle will be repeated rapidly again, and again, just as soon as the repeat paths 342 and 344, the exit path 346, and thence path 348 leading through the microprocessor make their first completion.

In case the engine would speed up beyond its desired speed, as in the tractor encountering a downslope, the speed logic mode reacts through the blocks 326, 328, 336, compare diamond 340, diamond 350, and modify block 352 to cause more gear reduction; in other words, the engine speed-up, causing point C (FIG. 4A) to be reached, decreases the command ratio by raising the denominator, engine speed, so that by comparison the actual reduction ratio by staying the same becomes the greater ratio of the two, relatively speaking.

Therefore, as caused by the slight downslope of Example II, the greater effective gear reduction required in block 352 is achieved by appropriately modifying the actual ratio at that point and the thus modified actual ratio signal is transmitted as the new output in path 354,356 thus changing the proportional coil 134 and swash-plate tilt angle into some less positive angular direction to increase the reduction to account for the higher engine speed. So the constant ground speed is sustained as desired on the slight downslope. If the engine speed decreases, as when the tractor levels out, the command ratio will then exceed the actual ratio and the signal will go from compare diamond 350 to modify block 360 which will modify the ratio to less reduction. To maintain the constant ground speed, this operation continues until the engine speed comes down to an equilibrium point.

In contast, consider the foregoing Example I situation in which a higher ground speed at the initial 1:1.5 gear reduction ratio was automatically temporarily slowed because of an assumed extreme but momentary rimpull overload. The predominant primary or power limiting logic caused more gear reduction to maintain the engine speed, and suppressed the speed mode which would have required less reduction to maintain ground speed. Then with the tractor overload past and gone, and with the initial (lower) rimpull restored, the microprocessor, still in its power limiting mode, because the ground speed is less than the desired speed set by the speed lever 22, operates to restore the initial engine speed in the expected way, by means of less effective gear reduction (diamond 350, block 360) until the initial 1:1.5 is reached, restoring the former BSFC stability.

The modify block 352 and the just mentioned modify block 360 are referred to later in aspects to be discussed of the speed control logic mode of the control module.

MIN. BSFC CURVE—FIG. 7

The wide open throttle torque curve indicated at 362 in this figure is representative of automotive diesel engines in general use, is a simulation of the operating characteristics of a commercial International Harvester DTI-466B engine. The points JKL indicated on the curve bear noting.

In the prior art, the peak torque point J is crucial to known anti-stall controls, whose straightforward purpose is to avoid passing that point of operation during engine slowdown because the immediate torque dropoff thereafter will stall out the engine and cause it to lose the load. Terming that purpose straightforward is for the reason that it is strictly negative, to avoid actually reaching the single overload point by automatically, just beforehand, downshifting the transmission and slowing the vehicle. See "Earth Movers Dig Into Computers," *Chilton's Truck & Off-Highway Industries,* January-February, 1983, pp 33-35 and inset article.

Another prior art notion in vogue in the tractor art is to shift up and throttle back, thus going in the direction of losing the load but actually stopping short of the torque peak so as to meantime keep safe and yet save some fuel.

The direction taken by the present invention is not so much for merely avoiding a single taboo operating point, or for upshifting. The direction will be recognized from the power limiting mode hereof as somewhat the opposite, to keep down-shifting a variable transmission as it loads up to stay on the least BSFC curve as well as for readjusting the power lever when needed so that the engine will actually positively follow rather than avoid, all points defined by a least BSFC curve. The result is reduced fuel consumption. For example, the essentially straight portion of torque curve 362 defined at rated power by points K and L will be seen closely to parallel the constant 180 HP (135 kW) broken line and the constant 200 HP broken line appearing in the FIG. 7 graph. But operating at full-throttle as indicated at point K (approximately 190 HP) would consume excess fuel, according to the graph.

What is significant and more desirable, is operating the same way but automatically at point L which in some instances will be accomplished at a 5 percent fuel saving, nevertheless developing about the same 190 HP. That fuel saving has been observed in one or more tractors embodying the present invention.

Superimposed on the graph of FIG. 7 are the diagonally upwardly and leftwardly extending straight governor curves, starting from the bottom for instance as 1000 engine rpm, 1500 engine rpm, 2000 rpm, etc., corresponding to different settings of the power lever 18.

Also superimposed are the known, seemingly concentric constant brake specific fuel comsumption curves, rather much centering in regular way about the 0.35 curve indicative of 0.35 pounds (0.16 kg) of fuel consumed by the engine per horsepower hour. Radially outwardly therefrom appear the surrounding curves marked for respectively 0.36 pounds, 0.37 pounds, 0.38 pounds, 0.40 pounds, 0.42 pounds, and 0.45 pounds (0.20 kg) per horsepower hour.

Returning to the constant horsepower lines (broken), we can perceive that the 60 horsepower line is closest to the 0.38 pound curve at only one point, the 80 horsepower line is closest to the 0.37 pound curve at only one point, and so forth. That resulting pattern of points establishes the locus of points for a smooth broken line curve 364 joining all such points and being essentially coincident at the upper right end with the 0.35 pound curve which is the most saving of all in effective fuel utility. It follows that such curve 364 is truly representative of near-minimum brake specific fuel consumption for the engine throughout the entire range of horsepowers enveloped by the wide open throttle torque curve 362 for the engine.

That same locus of points once established according to a figure such as FIG. 7 readily transfers to a figure, such as FIG. 4 preceding, as a conveniently smooth curve 136 in the latter figure approximating the least brake specific fuel consumption and vital to the present control module.

That curve 136 of FIGS. 4A and 4B represents simply a predetermined consecutive series of desired engine speed values productive of substantially minimum brake specific fuel consumption for a range of engine power settings; so it can be stored in the microprocessor memory as a rough table if the memory is somewhat restrictive. With extensive memory capability of the microprocessor, the table can be stored with only incremental differences in the speed values not requiring interpolation.

However, with average memory assigned, as contemplated for the present microprocessor, reducing the curve 136 in known way to a simple engine speed equation will enable the microprocessor constantly to resolve the equation for solutions in precise digital terms for each and every setting to which the power lever 18 is adjusted. So actual speed becomes a function of the power lever setting in the equation, the setting constituting the variable control parameter of which the changing values are constantly being entered in the equation by the computer for recalculation of same.

The wide open throttle curve of the torque of a combined engine-transmission train having infinite variability actually consists of an infinite number of curves constituting a family which keeps peaking more and more with more speed reduction in the infinitely variable transmission; the reason is the torque capability naturally becomes higher and higher with succeeding increases in transmission gear reduction ratio.

POWER TRAIN CURVES—FIG. 8A

In the graph of this figure with transmission output torque plotted against transmission output speed, only three curves appear of the wide open throttle torque for the overall engine-transmission combination.

At the transmission's least speed reduction ratio which is essentially 1:1, the torque curve 366 therefor closely approximates the torque curve of the engine alone and would be identical thereto if the transmission happened to be geared to deliver an exact 1:1 ratio. In the manner as done previously, the least BSFC broken line curve 368 is readily superimposed, effective during only the approximately 1:1 reduction ratio transmission setting.

Visibly distinct, the overall torque curve 370 is shown constructed for a transmission reduction ratio of 1:1.5, which happens conveniently to occur when the sun gear, previously discussed, is hydraulically locked against retrograde or forward movement. The broken line least BSFC curve 372 is readily superimposed appropriate only to that transmission reduction ratio.

Finally, for visual comparison at the other extreme, the overall train torque curve 374 represents the condition of the transmission providing maximum gear reduction of 1:2.39 for greatly multiplying torque and rimpull. The appropriate least BSFC curve is plotted in broken lines at 376. A pattern of points WXY emerges establishing the locus of least fuel consumption points connected by a smooth average curve 378 for the entire reduction range of the present speed transmission.

Figure 8A:
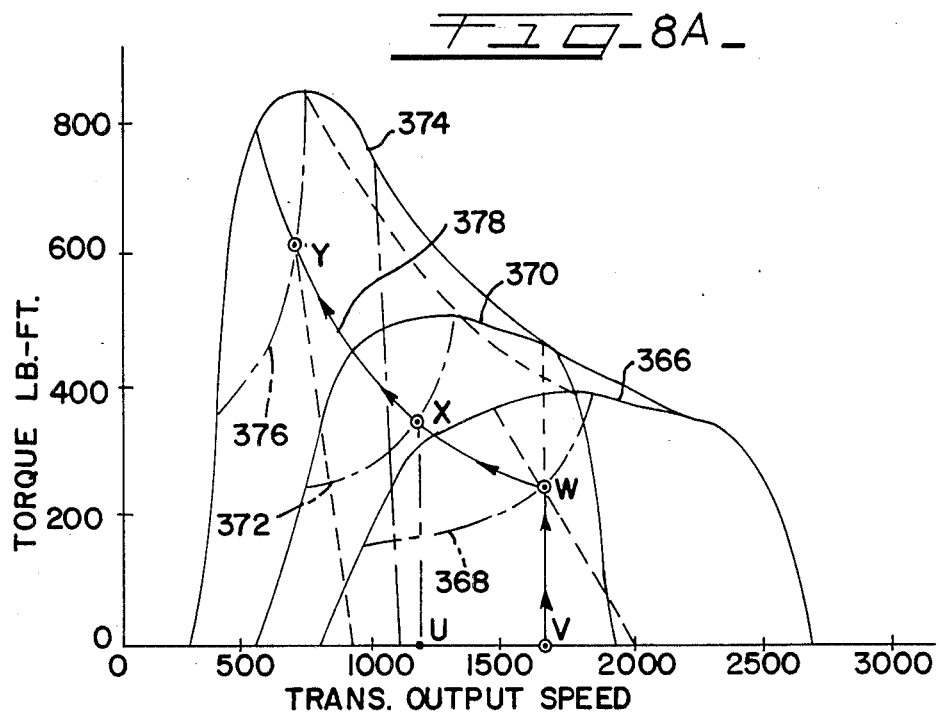
FIG. 8A is a transmission rpm-torque graph showing rated power torque for three arbitrary but representative transmission gear reduction ratios, each with its individual superposed least BSFC curve, and the discerned patern of least BSFC points, the locus of which generates a discrete single line lug curve

As viewed in FIG. 8A, the diagonally upwardly and leftwardly directed straight broken lines represent the engine governor limited portion of the individual overall drive train torque curves of the engine-transmission train. As will be seen, during automatic operation, the transmission output speed or ground speed does not follow the portion of the curve (although the engine does).

It can be seen that from the zero torque point U on the transmission output-speed axis that an increase of torque straight up to point X on the reduction range curve 378 will result in minimum brake specific fuel consumption for the transmission setting of 1:1.5 speed reduction. If increased ground resistance to wheel speed causes the control module hereof automatically to provide more gear reduction in the speed transmission, the transmission can readily accommodate as the operating point viewed graphically rises up the curve 378 toward Y thereon.

The starting point W for the overall train torque curve WXY can be considered typical and represents specifically the assumed initial condition of a steady load, a speed lever setting fixed for a 1:1 ratio, and a power lever setting fixed for 2000 rpm so that the engine under automatic minimum BSFC operation is being run at the corresponding minimum BSFC speed of approximately 1650 rpm. To hold to the latter speed, despite increases in the steady load, is to hold to near-minimum specific fuel consumption. Because BSFC curve 368 has an infinite number of points W thereon available as starting points, depending on the power lever setting, the family of overall drive train torque curves akin to WXY is of infinite number and not attempted to be illustrated.

EXAMPLE III

An extreme example now given brings out the full adjustment capability of the present automatic power matching train operation. Speed logic is a straightforward way of establishing the stabilized initial condition just set forth. So in speed logic mode and despite governor droop, and from a transmission ratio of roughly 1:1.2 at point V on the FIG. 8A graph, the constant ground speed or second mode of operation will continue to change the transmission ratio maintaining a constant transmission output speed as the torque increases straight up toward operating point W as rimpull load is increased. Meanwhile, the engine speed is being slowed by the load to the above-assumed 1650 rpm. Thereafter, the power limiting logic mode goes into effect automatically as result of the tractor's reaching its load and a very slight undershoot of the 1650 rpm point and maintains the tractor operating at W as desired on the WXY curve 378.

Specifically on the reduction range curve 378 for the speed transmission, already producing minimum BSFC in the engine, the transmission upon encountering increased resistance is caused automatically to introduce more gear reduction and, at reaching of the operating point X, the transmission will again have the engine operating with minimum BSFC still at 1650 rpm, but at an adjusted transmission ratio of 1:1.5. Further resistance increase of the tractor load shifts the operating point to approach Y, progressing thereto smoothly and always along the reduction range curve 378. And the full multiplication of torque, with a torque rise by 2.39 times, occurs with the reaching of point Y.

The significance is that, while on the WXY portion, the engine does not lug; it operates always and only on points on the curve WXY at the least BSFC, speed, 1650 rpm, and entirely automatically with the same power setting and with no change from or intervention by the operator.

The return pattern, on the same curve W,X,Y equally efficiently, begins as soon as the resistance no longer requires the extreme of 2.39 torque multiplication for sufficient rimpull of the tractor. The striking part to the operator, however, is progress in direction of the arrows on the reduction range, smooth curve 378 where he never detects the engine laboring even though tractor speed naturally slows during a stretch of highly burdensome soil resistance. It will be appreciated from the contrasting operation, that in constant ground speed mode, as from point V to W, for example, least BSFC is not maintained.

EXAMPLE IV

There is a relationship between the modify block 360 of flow diagram FIG. 6A and the transition indicated by arrows from point V straight up to point W in FIG. 8A. The control module operates in the second constant ground speed mode beginning at point V where it compares actual ratio with the command ratio and finds that, under increasing torque loading and as the engine slows down, the actual ratio is the lesser. So less actual gear reduction is required than the existing 1:1.2 ratio and the transmission moves toward establishing a 1:1 gear reduction ratio by the time the operating point W is reached, all progressively so as to maintain constant speed in the speed mode for reaching point W, FIG. 8A. Therefore, the so-called governor droop illustrated by the natural, broken line, diagonal governor curves is avoided because there is no droop in the constant ground-speed mode of the microprocessor.

EXAMPLE V

The transmission in its secondary speed mode also desirably operates in the opposite direction, and autoically does so according to modify block 352 in flow chart FIG. 6A, in going through the opposite transition from point W straight down at constant speed toward the aligned zero torque point V, FIG. 8A. The circumstance is the gradual removal of appreciable torqueloading on the transmission and a thus increased engine speed so that the actual ratio sensed is greater than the command ratio and is readily determined according to the notation between compare diamond 350 and modify block 352, FIG. 6A. So, counter to the direction of the arrows, and with constant ground speed maintained between W and V, FIG. 8A, the automatic operation changes the transmission from 1:1 at W to a 1:1.2 at V for more gear reduction to counteract the natural loss-of-load speed-up of the engine; the slowing-down transmission and unloaded engine speed-up will offset one another, with constant ground speed maintained all during the transition.

By flow chart, FIG. 6A, the step represented by block 352 is to modify the command ratio starting at that point W and the thus modified command ratio signal is transmitted as new output in paths 354 and 356, thus changing the proportioning coil 134 and swash plate tilt angle into some less positive angular direction for more effective gear reduction.

EXAMPLE VI

This example is merely cumulative to Example II preceding, but importantly illustrates what can be carried to an extreme situation very possibly encountered. Let it be assumed that the present tractor is proceeding easily on a slight slope with a heavy wagon lightly in tow, with the power train automatically operating with practically no reduction, let us say a ratio of 1:1 for simplicity. The tractor and tow immediately encounter an extended severe downhill condition so as to operate at some unmarked point vertically over point C, FIG. 4A; such point in fact would be a motoring point above no load curve 138, that is, the wagon is pushing the tractor. The power mode is fully satisfied because the control sensors of the microprocessor serve only to assure it, while in that mode, that the actual engine speed is kept up to desired speed or, in graphical terms, that speed remains on or above the power match curve 136 in FIG. 4A and the ground speed is at the desired speed.

Due, therefore, to the relative decrease of command ratio in this assumed situation, the actual ratio by comparison becomes the larger of the two and gives rise to a signal which can be represented by the reaction of block 352 as required in the FIG. 6A flow chart. Consequently, as the rolling wagon tends to force the tractor downhill faster, a modified command ratio signal from block 352 is transmitted in paths 354,356 to cause the swash plate to establish more and more effective gear reduction up to approximately a 1:2 or perhaps a 1:2.39 ratio. The engine is thus being motored to increasing speeds through the transmission by the wagon and tractor due to their downhill coast. So the full braking capability of the engine is brought to bear automatically in the speed mode to ensure positive vehicle control.

By way of departure from the earlier presumption of the range transmission always being in the medium or mid range M, it remains entirely in the operator's province to upshift and downshift at will (FIG. 3), as when the speed transmission is approaching full positive angularity in its speed overlap with the HI range or full negative angularity in overlapping the LO range (FIG. 2). So when the load becomes such that the speed transmission's range can no longer automatically accommodate to achieve near-minimum BSFC, the way is always open for the operator readily to restore the speed transmission to within its effective speed ratio range by shifting into HI for the lesser rimpull loadings or into LO for any excessive loadings.

Or an easier way is open, for effecting rather substantial changes, through power lever adjustment which can readily be brought about automatically to restore the near-minimum BSFC and constant ground speed operation desired. Novelty is felt to reside in the herein recognized utility to set power according to requirements in terms of its specific fuel consumption and the maintenance of constant ground speed and in the automatic module approach herein for automatically satisfying that utility as can be graphically appreciated.

AUTOMATIC POWER SETTING FOR MINIMUM BSFC

FIG. 4B enlarges a portion of the FIG. 4A graph of actual engine speed plotted against engine power lever or throttle setting. On the power match curve 136, the illustrative point A represents the power match point at which a power lever setting of 1950 rpm produces an engine speed of about 1800 rpm if sufficiently loaded to be in the power limiting mode. This steady match between load power required and engine power delivery at minimum BSFC is ideally desired and would hold, except that some operational variable will inevitably change.

EXAMPLE VII

If, while the power train graphed is operating at matched power point A, a significant decrease in soil resistance or a moderate downslope or both are encountered, the control module 24 is capable of entering into an operating mode reducing the power lever setting. This occurs automatically when the speed of the more lightly loaded engine increases toward the no load condition curve 138 toward point E, which is entirely outside, on the high speed side, of a power lever deadband 380 graphically appearing as a cross-hatched envelope above, and parallel with, the power match curve 136. The so-called width of the deadband is illustratively shown as amounting to about +50 above all corresponding points on the curve 136. The deadband does not extend below the curve 136.

More particularly, as the sensed engine speed increases above the deadband 380 for the power lever, and at the same time that the speed mode is adjusting the transmission ratio to maintain constant tractor ground speed, the control module 24 also begins to cause a power lever setting reduction which continues until the engine reaches that reduced setting where the load is precisely sufficient to bring engine speed directly down into intersection with the deadband 380 as indicated at the desired point F.

At or just below this new operating point F, the module 24 continues in its regular speed mode of operation to keep the transmission adjusted for the new power setting, to maintain constant tractor ground speed at the desired speed as long as the engine speed is no lower than its point of intersection with the closely adjacent power match curve 136. The control module 24 is rendered more sensitive in its speed mode for doing all the fine tuning so to speak, that is, while automatically adjusting the transmission ratio in incremental amounts within the range graphed. It should be noted that the point E can only be reached transiently and is not a steady state operating point.

EXAMPLE VIII

In this contrasting example, and from operating point A at the outset, let us assume the plowing resistance of the soil increases which would cause engine speed to drop transiently toward the level point B, below the power match curve 136. The control module 24, in its power limiting mode described above, immediately begins to change the transmission ratio for more reduction to raise the engine speed to its optimum BSFC point A, which effectively reduces the transmission output speed or ground speed. The control module 24 further senses the change in transmission ratio beyond a deadband 381 (FIG. 8B) and causes a power setting advance.

When the power lever setting is advanced, the engine accelerates and the engine speed exceeds the power match curve 136 shifting the command module into the speed mode which increases the transmission reduction to account for the increased engine speed. Within the deadband envelope 381, the desired transmission output or ground speed becomes equal to the actual output or ground speed and so a new steady state operating point H is reached at the left side of the deadband 381 shown in FIG. 8B with the engine operating at a new minimum BSFC point H on the power match curve FIG. 4B.

If, from this stable operating point, the load decreases slightly, the control module 24 will shift into power limiting mode and cause the drive train to first cross the deadband to the desired speed line VW in FIG. 8B and then shift into the speed mode as described above. When the automatic power lever setting is engaged, the drive train will not follow the curve WXY of FIG. 8A beyond the width of the deadband. Rather, it will adjust for increased loads by increasing the power lever setting until it reaches the maximum setting at point Z' at which point, the drive train will follow, as indicated by the arrows in FIG. 8B, the curve 374 or Z'Y' upon further increases in load. Once beyond the point Z', a decrease in load will cause the drive train to follow the path Y'ZWV with the power lever setting automatically adjusting down as the engine speed increases above the deadband 380 of FIG. 4B as explained in the preceding example.

Again, incremental adjustments will be fine tuned into the power train through appropriate incremental transmission ratio changes by the module, which is more sensitive in its power limiting and speed modes compared to when it causes power setting changes.

Because it constantly monitors actual engine speed and constantly monitors the nominal power setting, the control module 24 can not only program the power setting for minimum BSFC but also is provided with power means for automatically changing the power lever position at least part way toward such a setting.

POWER LEVER MOTOR CONTROL—FIGS. 1 and 5

As shown electrically connected to the output leads 81 of the control module 24, a preferred power means is a reversible DC motor 83 which is shaft-connected to mechanically pivot the power lever 18 into various positions throughout its range of power settings. A manual switch MS, identified by reference numeral 137 in FIG. 5, when closed connects B+ power to energize a motor circuit 150n controlling the output leads 81 to the motor. When the manual switch 137 is open, the power lever is only manually controlled as described above. The motor control circuit 150n is to be considered substantially identical to the companion circuit 150m for the swash plate control.

The built-in protection and safeguards described for circuit 150m as it accurately controls the swash plate tilt angle afford the same benefits to the identical circuit 150n as it equally accurately controls the pivot angle of the power lever.

In actual practice, however, the power lever will have a motor control circuit, not shown, and a reversible, single speed slow DC motor, of greatly simplified design compared to control circuits 150m and 150n. The reason is the requirement in practice that the microprocessor 140 have high sensitivity in the power and speed modes and that the proportionally moving swash plate actuator 26 have correspondingly high responsiveness, i.e., in 0.3 seconds, execute full travel from one extreme tilt angle to the opposite extreme, and vice versa. On the other hand the power lever 18 will take 10 seconds, motor time, to be driven thereby at constant speed through full travel, either way; hence due to this relative insensitivity and more deliberate response, the simplified circuit just suggested and not shown, can operate a simple DC reversing switch to the lever motor but the circuit preferably will incorporate the same protection and safeguards previously mentioned, and be rendered fool-proof to a like extent.

The high responsiveness of the swash plate actuator 26 to change the transmission ratio compared to the slow response of the power lever control motor 83 establishes a priority in the manner in which the control apparatus as a whole adjusts to varying conditions of load and/or desired ground speed. Thus, when a sufficiently large deviation in ground speed from the desired value exists, the control apparatus will simultaneously adjust the transmission ratio, in the power limiting mode described above, as well as the power lever setting to reduce the deviation. Because of the relative response times, the transmission ratio adjustments will bear the brunt of this correction. When the deviation results in an increase of engine speed beyond the desired value, the speed mode of the transmission control will maintain a constant ground speed while the power lever control will correct engine speed deviation, both controls acting relatively independently.

Exhibiting flexibility in the same vein as in its power and speed modes of operation, the control module 24 as shown in FIG. 5 is not confined to any set number of steps or sequence or order for automatic power lever operation, although for ease of understanding, the flow chart approach will now be used, simply by way of one example and not limitation.

POWER CONTROL FLOW CHART—FIGS. 6A+6B COMBINED THRU 344 RE-ROUTE PATH

Devoted exclusively to showing the automatic power lever control logic, FIG. 6B is outlined by the referred to non-involvement path 342,344,346 representing the condition in which the power lever adjustment logic remains fully satisfied, manifested by the power lever marking time. But by following path 342 through interconnecting diamonds 382 and 384, by way of just noting them in passing, thence to underratio comparison diamond 386, one can see from the legend identifying the latter 386 the capability of the microprocessor to constantly monitor the command ratio for every deviation of more than 2 percent below the command ratio for the desired ground speed, i.e., the desired command ratio, that is, 2 percent of the possible range of the transmission ratio.

Continuing by following the path from 386 through interconnecting diamonds 388 and 390, by way of noting them in passing, thence to overspeed comparison diamond 392, one can see from the labeling on the latter, the further capability of the microprocessor to constantly monitor actual engine speed for every deviation in speed in excess of 50 rpm above the desired speed being calculated. The mentioned deviations, both ways, permitted by the automatic power control for each power setting establish the previously discussed deadbands 381 and 380 respectively now to be treated in detail.

OPERATION UTILIZING POWER SETTING DEADBAND—FIG. 6B

So long as underratio comparison in diamond 386 by the microprocessor shows the command ratio to be below but within the 2 percent (based on the ratio range) of the desired command ratio determined by the microprocessor, then according to the No answer from comparison diamond 386, the automatic power control will be satisfied and not activate. On the other hand, with the underratio detected as going more than 2 percent below the desired command ratio, the microprocessor logic from diamond 386 follows the Yes path 394 through an interconnecting throttle diamond 396, by way of just noting it in passing, thence to the increase throttle block 398. According to the flow chart, therefore, the step represented by the block 398 is for the microprocessor to signal for a greater power setting. So the microprocessor is programmed to run the lever motor to pivot the throttle or power lever 18 for sufficient power increase to eliminate the degree of underratio back to at least within 2 percent of the desired command ratio.

According to the No answer, FIG. 6B, from the overspeed comparison diamond 392, the automatic power control logic remains satisfied so long as the actual engine speed stays within 50 rpm of the desired speed. But with each overspeed in excess of 50 rpm, the microprocessor logic conforms to the Yes path 402 from diamond 392 through interconnecting diamonds 404,408, by way of just noting them in passing, thence to throttle decrease block 410. So the microprocessor is programmed to run the lever motor and reduce throttle or power lever 18 until excess overspeed is eliminated down to within 50 rpm above the desired engine speed.

The microprocessor 140 has further utility now to be explained.

FIG. 6B—PROGRAMMED SAFEGUARDS IN MICROPROCESSOR LOGIC

The consecutively connected gear diamond 382 and clutch diamond 384, together with their respective No and Yes paths for the logic involved, are operatively associated respectively with the out-of-neutral switch 133 shown in FIG. 3, and the normally open, clutch pressure switch 97 shown in FIG. 1. The switch input, by appropriate but unshown input connections to the microprocessor 140, is constantly monitored by the latter as one of its important safeguard functions presently to be considered.

When either or both of the switches 135 and 97 dictate it, the microprocessor puts the automatic power control in inactive status, i.e., because of switch 135 closing to indicate a neutral transmission 28 or because of switch 97 closing to indicate a disengaged master clutch 92. In other words, the logic path is No from gear diamond 382 or from clutch diamond 384, or both, and so the normal power lever control logic is overruled and must be so overruled because the engine cannot be loaded through the interrupted power train. If allowed at this point to become active, the automatic power control would keep sensing overspeed in the engine running free of load, and keep slowing it down, ultimately to 50 rpm above low idle despite the operator desiring a higher speed, for example, to set the tractor in motor from standstill.

A Yes answer in the logic path from gear diamond 382 in conjunction with a Yes answer in the logic path from clutch diamond 384 represents the right combination of conditions for automatic power control, that is, the out-of-neutral switch 133 opens to indicate the range transmission is in gear and the normally open pressure switch 97 opens to indicate release of the clutch pedal and full clutch engagement. So the power lever requires control, now that the engine is coupled to load.

There is an operating point, for example, point W on FIGS. 8A or 8B, at which the speed transmission reaches its maximum commanded ratio condition, i.e., producing least effective gear reduction occurring at +17° swash angle, and the sensing of which is represented by the commanded diamond 388 is interrelated with underratio comparison diamond 386, directly in the latter's No. path, and is also interrelated with overspeed comparison diamond 392 by way of the immediately intervening high idle safeguard diamond 390. Therefore when the underratio function has a satisfied condition (No from 386) sending out no signal, the next-in-logic-sequence commanded ratio, diamond 388 will be afforded the Yes path as illustrated leading through safeguard diamond 390, path 394, throttle diamond 396, thence to throttle increase block 398; the resulting increased throttle increases the engine speed and causes the speed mode in the microprocessor to react by increasing the gear reduction to maintain constant ground speed, deswashing the speed transmission back from the +17° extreme tilt angularity, thereby providing some range for future change in the transmission ratio.

To explain it graphically by returning momentarily to FIG. 8a, with the increase in throttle, the points WXY and the curve between them shifts parallelly upward along the curves 368,372,376. However, since the load on the tractor and the desired ground speed have not changed, the drive train operating point remains in the same position on the graph as before, on the vertical line VW, but is now slightly below a newly established power limiting logic curve WXY and is therefore in the speed mode.

The effect of commanded block 388 is limited, on the one hand, by its resolution, i.e., how close does the commanded ratio have to be to the maximum commanded ratio to get a Yes, and, on the other hand, by block 392 which will automatically reduce the power lever setting if the engine speed exceeds 50 rpm over the desired engine speed.

The reason for the assurance that engine speed stays below, or at most at, 2700 rpm, the sensing of which is represented by high idle diamond 390 that is in safeguard position to commanded diamond 388, is to establish maximum engine operating speed which, for the engine in question, is 2700 rpm. So as illustrated, the Yes path from diamond 388 indicating extreme (+17°) plate angularity requires that engine speed simultaneously be less than the 2700 allowed maximum rpm in order for the Yes path from safeguard diamond 390 to show a call for increased throttle to speed up the engine. Of course, the 2700 rpm could be some number over high idle to prevent transient actuation of diamond 390.

The No path from commanded diamond 388 and the No path from high idle diamond 390 are illustrated to indicate that overspeed logic becomes effective, as represented by overspeed comparison diamond 392, as soon as either one has a No; that is to say, the commanded ratio relationship is compatible with slowing the engine by being less than maximum ratio or, if already at maximum, the (overriding) attainment by the engine of its top allowable operating speed will find full compatibility to an engine being slowed in speed, for whatever reason the programming might call for. Thereupon the microprocessor as programmed can start applying its overspeed logic for appropriately decreasing throttle to alleviate the overspeed conditions when they occur.

The intervening swash diamond 404 as shown located in FIG. 6B between overspeed diamond 392 and the block 410, representing throttle decrease, evidences that the microprocessor logic requires that the commanded ratio sensed be less than maximum in order for the Yes path from diamond 404 to allow the overspeed control to decrease the throttle. In other words, the overspeed condition is not allowed to throttle down the engine, at the same time that the swash angle reading being monitored by the microprocessor shows the speed transmission to be then running at maximum commanded ratio (least mechanical advantage) at high idle speed while the microprocessor is operating in speed mode.

The rpm diamond 406, representing the engine safeguard logic which protects when the engine is being motored, as by a trailer in a downhill condition such as example VI above, has a No path which according to FIG. 6B goes to the right and exits with no signal, when engine speed is below 2800 rpm. Yet the Yes path from 406 indicates that the throttle decrease step represented by block 410 goes on automatically until the motoring of the engine reduces to a speed below 2800 rpm.

The No path from overspeed comparaison diamond 392 and the No path from swash diamond 404 properly indicate that the motored top speed logic limit becomes effective, as represented by the 2800 rpm diamond 406, as soon as either one is sensed as the first No to occur; that is to say, the overspeed comparison finds compatibility with *motored* overspeeding by being less than the +50 rpm in excess or, if already in excess by more than the +50 rpm, the (overriding) attainment by the commanded ratio reaching maximum (minimum effective gear reduction ratio) will find full compatibility with motored overspeeding and the need to throttle down the engine. Thereupon the microprocessor as programmed retards (at 410) the power lever to avoid adding fuel to the engine which is being motored thereby enhancing its engine braking.

The reason for throttle monitoring as represented by maximum throttle diamond 396 and by minimum throttle diamond 408 in their No and Yes paths of association ahead of the powered throttle change blocks 398,410, respectively, can be explained in a few words. The microprocessor logic herein requires no unnecessary act, and so no throttle increase or decrease signals will be allowed when the power lever already occupies the maximum or minimum settings, respectively.

The overspeed comparison and underratio comparison programming described so far has required the microprocessor internally to have a main overspeed circuit and a main underratio circuit, each operating on three counts which corresponds to the 50 rpm and 2 percent deviations, for accuracy which has proven satisfactory in the field. Reaching the third count, either upward from power match curve 136, FIG. 4B, or leftward from transmission output speed line VWZ in FIG. 8B means that the deadband 380 or 381 is no longer effective because it has been crossed. So there will be automatic power control with any further deviation in engine or transmission output speed respectively, to bring the operating point back to the adjacent edge of the deadband on the graph.

From the foregoing it can be appreciated that the automatic power control is merely augmental to the much more sensitive power limiting mode or speed mode, both operating from four principal signals. The power lever is the source of the first signal because its setting is being constantly monitored, and the speed lever is the source of the second signal because its setting, too, is being constantly monitored. The third signal developed is proportional to the common engine-transmission-input speed, and these three signals enable the microprocessor accurately to dictate how the transmission speed reduction ratio is changed in response to a speed error detected between the third speed signal and a desired engine speed signal computed as a constant recalculation by the computer; the fourth signal, of course, is the conveniently taken transmission output speed value digitally necessary in the computer for determining the commanded ratio which the changed speed reduction ratio must match and its deviation from the desired commanded ratio.

Then, from a less sensitive and less responsive area of operation, not only dominated by transmission control priority requirements but also dominated by a conspicuous deadband system, the automatic power control comes on, due to the four signals enabling the microprocessor accurately to dictate how the automatic power control is to change the power lever setting in response to the speed band error or the commanded ratio error.

Besides applying torque to the rest of the power train including the drive axles illustrated herein, the engine of the present power train separately but equally effectively drives the conventional single speed or dual speed power take-off (PTO) shaft of the tractor, now shown. The control module does not affect the PTO output although the effect of the PTO and air conditioning and other loadings about the tractor is included in the control module's operation. In other words, the two sensors of speed and other sensors hereof take into account all engine loading for engine optimization automatically with the sequential transmission ratio setting and automatic power setting.

The load on the farm tractor, from the auxiliaries just mentioned and on the drawbar, varies considerably with the nature of the work which includes, of course, merely towing a wagon or idle machinery. On a long downslope where the drawbar pull becomes negative and the tow and tractor develop a momentum motoring the tractor engine, the electrical circuit of the power lever motor 83 and the electrical hydraulic circuit of the swash actuator 26, FIG. 1, automatically establish cooperation offsetting excessive engine speeds, as exemplified below.

EXAMPLE IX

The effect of sustained rolling downgrade by the tow and tractor is to increase engine speed and ground speed. Programmed to keep the ground speed constant in speed mode in the manner described, the automatic transmission control sets the ratio eventually for maximum; the ultimate effect is that the tractor axles are forced to drive the engine through equivalent step-up gearing at an effective speed increasing ratio of 2.39:1. And by its desired complementary action, the automatic power control sets the engine throttle eventually to a low fuel rate for some minimum rate of engine rpm. The engine braking, due primarily to pumping losses, affords positive vehicle control because the tractor axles in order to turn are forced to drive a persisting load and must do so only through high ratio step-up gearing.

EXAMPLE X

Drawbar pull can require in cases 50% to 80% of engine power in a farm tractor, as in drawing a disk harrow, or a much less percentage in a level towing operation. The automatic transmission control can, within the range of drawbar power requirements herein contemplated, automatically establish near-minimum BSFC at infinitely adjustable speeds within the range of approximately 3 to 8 miles per hour (mph) ground speed or 4.8 km/hr. to 12.8 km/hr., all in a mid range setting of the range transmission, now shown. The synergistic effect of the automatic power control when coupled therewith is to afford infinite speed adjustability within the larger ground speed range of approximately 1.5 to 8 mph (2.4 to 12.8 kM/hr.); this effect, with a constant view to achieving least BSFC, is obviously separate in its view from the synergism apparent in preceding Example X, which is accomplished with an eye toward positive vehicle control during sustained coasting, without the least regard to BSFC.

It is evident the invention applies equally to other continuously variable transmissions (CVT's) including the lower horsepower, belt drive type, continuously variable mechanical transmissions. Also the present principles apply with equal force to further engine-CVT power trains, hydrostatic and hydromechanical and others. Although perhaps not ideal for maintaining the engine exactly on the least BSFC curve, the invention can also be applied to step change power shift transmissions. Indeed, given enough gears, a power shift transmission eventually approaches a continuously variable transmission.

What is claimed is:

1. A drive train system for an engine-powered vehicle and including efficiency control, comprising:
   a variable range transmission having a rotating output and providing a continuously variable range of speed reduction rations for adjusting the load on said engine and the speed of said vehicle, said variable range transmission including a transmission pump and motor hydraulic units with variable displacement to vary their speed ratio, and manual means for varying the output speed and torque of said variable speed output;
   electrically controlled hydraulic means to vary the displacement of said hydraulic units and correspondingly vary the variable range transmission output speed and torque;
   a fixed range transmission having a plurality of fixed, specific reduction ratios providing corresponding speed ranges;
   a first manually operable selector for selecting any of the speed reduction ratios of said variable transmission in said continuously variable range thereof;
   means responsive to said first selector for generating a first signal corresponding to the speed reduction ratio setting of said first selector;
   a second manually operable selector coupled with said engine for varying the power supplied by said engine and having a continuous range of power settings;
   means responsive to said second selector for generating a second signal corresponding to the power setting of said second selector;
   motor means coupled with said second selector for automatically changing the power setting of said second selector in response to a third signal;

control means responsive to said first and second signals for automatically controlling said engine and said transmission to maximize the efficiency of said drive train system, said control means including
(1) means for calculating the engine speed reduction ratio and power required to provide said maximum efficiency,
(2) a first control circuit for automatically controlling said transmission in accordance with the calculated engine speed reduction ratios,
(3) a second control circuity independent of said first control circuit for delivering said third signal to said motor means to automatically control the power setting of said second selector;

manually operable means for selectively disabling said motor means whereby the value of said second signal is determined by the manual setting of said second selector, said control means being still operative to control said transmission to maximize the efficiency of said drive train system when said motor means is disabled;

a command signal generator for connection to the electrically controlled hydraulic means to provide thereto a main command signal for setting desired output speed of the variable transmission by varying the pump-and-motor speed-ratio of same as it is dirven under engine power;

means for storing a memory a predetermined consecutive series of desired engine speed values which result in substantially minimum brake specific fuel consumption for a range of engine power setting;

first means connected to the memory for generating a reference command indicative of that particular engine speed value which is desired corresponding to the actual engine power setting;

second means for generating a second signal indicative of the actual engine speed; and third means for generating a third signal indicative of the setting of the first selector for varying the variable transmission output speed and torque;

said first and second and third means having means connected to the signal generator for modifying the main command signal automatically, in response to a deficiency of one of said reference command and second signal compared to the other.

2. The drive train system of claim 1, wherein said manually operable disabling means is mounted on said second selector.

3. The drive train system of claim 1, wherein said first control circit includes means for generating a pulse width modulated signal for controlling said transmission.

4. The drive train system of claim 3, wherein said transmission includes an electrically energizable coil energizable by said pulse width modulated signal, and hydraulic transmission control means controlled by said coil.

5. The drive train system of claim 1, wherein said second control circuit includes means for generating a pulse width modulated signal for controlling said motor means.

6. The drive train system of claim 1, including:
means for sensing the speed of said engine and for delivering a signal to said control means corresponding to the sensed engine speed, and
means for sensing the speed of the rotating output of said transmission and for delivering a signal to said control means corresponding to the sense speed of said rotating output.

* * * * *